United States Patent
Song et al.

(10) Patent No.: US 9,342,162 B2
(45) Date of Patent: May 17, 2016

(54) MOBILE TERMINAL AND CONTROLLING METHOD THEREOF

(71) Applicants: Yoomee Song, Seoul (KR); Jisun Lee, Seoul (KR); Soyeon Yim, Seoul (KR); Kyungjin You, Seoul (KR); Jihye Ham, Seoul (KR); Sinyoung Park, Seoul (KR); Yujune Jang, Seoul (KR); Sujin Kim, Seoul (KR); Jeongyun Heo, Seoul (KR); Jungbin Lee, Seoul (KR)

(72) Inventors: Yoomee Song, Seoul (KR); Jisun Lee, Seoul (KR); Soyeon Yim, Seoul (KR); Kyungjin You, Seoul (KR); Jihye Ham, Seoul (KR); Sinyoung Park, Seoul (KR); Yujune Jang, Seoul (KR); Sujin Kim, Seoul (KR); Jeongyun Heo, Seoul (KR); Jungbin Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/161,431

(22) Filed: Jan. 22, 2014

(65) Prior Publication Data

US 2014/0210744 A1    Jul. 31, 2014

(30) Foreign Application Priority Data

Jan. 29, 2013  (KR) .................. 10-2013-0009731
Feb. 4, 2013   (KR) .................. 10-2013-0012173

(51) Int. Cl.
G06F 3/01     (2006.01)
G06F 3/0354   (2013.01)

(52) U.S. Cl.
CPC .................. *G06F 3/03545* (2013.01)

(58) Field of Classification Search
CPC ...................................... G06F 3/0354
USPC ................... 345/156–180; 178/18.01
See application file for complete search history.

(56) References Cited

U.S. PATENT DOCUMENTS

| | | | | |
|---|---|---|---|---|
| 6,337,698 | B1 * | 1/2002 | Keely et al. | 715/823 |
| 8,638,320 | B2 * | 1/2014 | Harley et al. | 345/179 |
| 2007/0003168 | A1 * | 1/2007 | Oliver | 382/314 |
| 2007/0285405 | A1 * | 12/2007 | Rehm | 345/173 |
| 2009/0167702 | A1 * | 7/2009 | Nurmi | 345/173 |
| 2010/0095233 | A1 * | 4/2010 | Skourup | G05B 19/409 715/771 |
| 2010/0302152 | A1 * | 12/2010 | Kirigaya | 345/158 |
| 2011/0191719 | A1 * | 8/2011 | Hinckley et al. | 715/835 |
| 2012/0246594 | A1 * | 9/2012 | Han et al. | 715/790 |
| 2013/0016055 | A1 * | 1/2013 | Chuang | 345/173 |
| 2013/0050143 | A1 * | 2/2013 | Kim et al. | 345/174 |
| 2013/0106800 | A1 * | 5/2013 | Yilmaz et al. | 345/179 |
| 2013/0234957 | A1 * | 9/2013 | Shirato | 345/173 |
| 2014/0104188 | A1 * | 4/2014 | Bakken et al. | 345/173 |
| 2014/0313155 | A1 * | 10/2014 | Yilmaz | 345/174 |

\* cited by examiner

*Primary Examiner* — Grant Sitta
(74) *Attorney, Agent, or Firm* — Ked & Associates LLP

(57) ABSTRACT

A mobile terminal and controlling method thereof are disclosed, by which a prescribed function of the mobile terminal can be performed through a button manipulation of a stylus pen and a touch input. The present invention includes a short range communication unit configured to receive a plurality of different signals from a stylus pen, a touchscreen, and a controller performing a prescribed function by combining a type of a signal received from the stylus pen among a plurality of the different signals and a touch pattern of the stylus pen recognized on the touchscreen.

14 Claims, 26 Drawing Sheets

FIG. 5
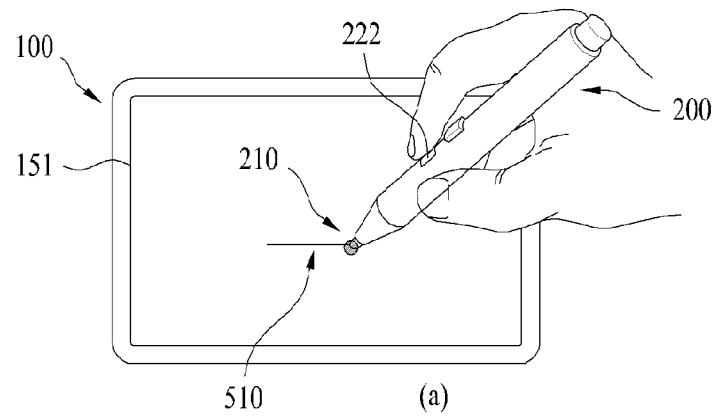
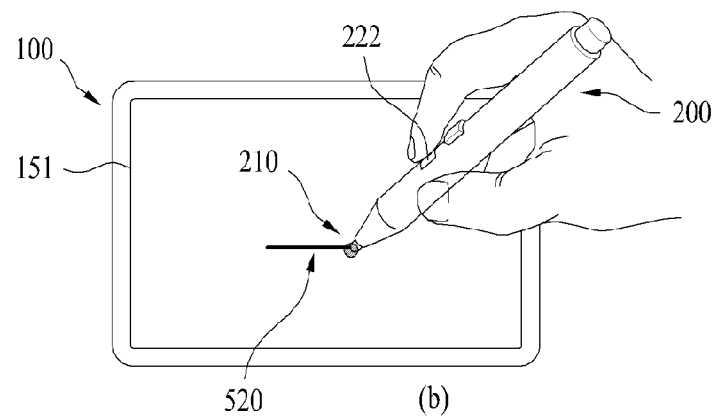
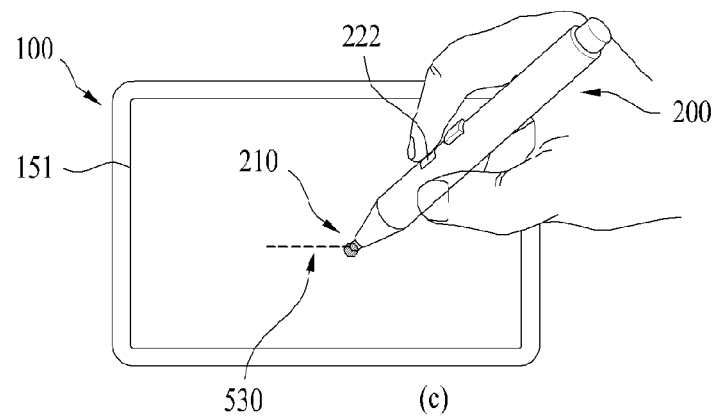

FIG. 6
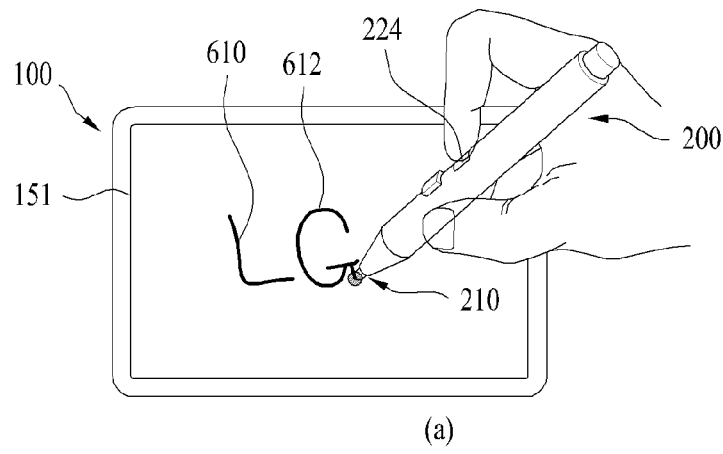
(a)
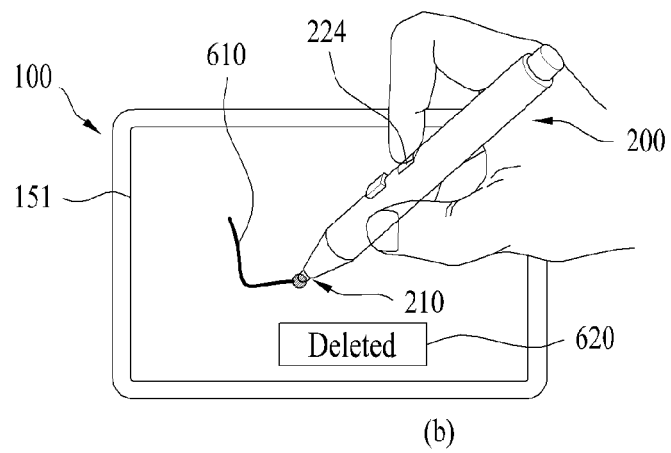
(b)
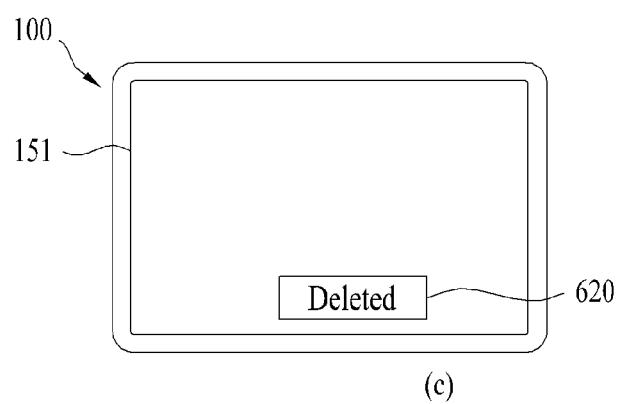
(c)

FIG. 7
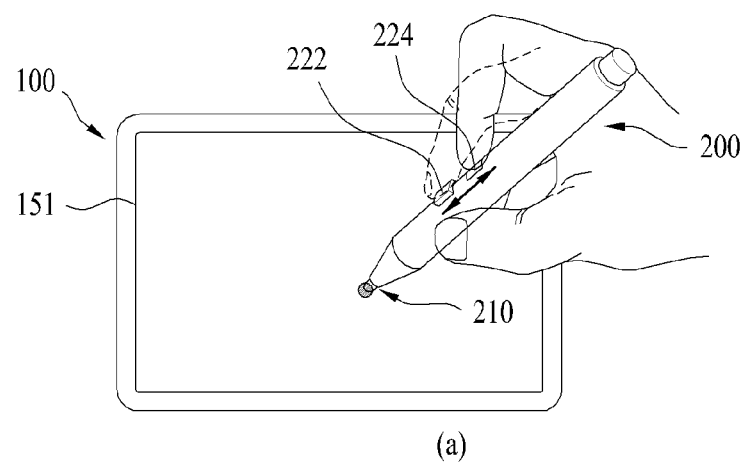
(a)
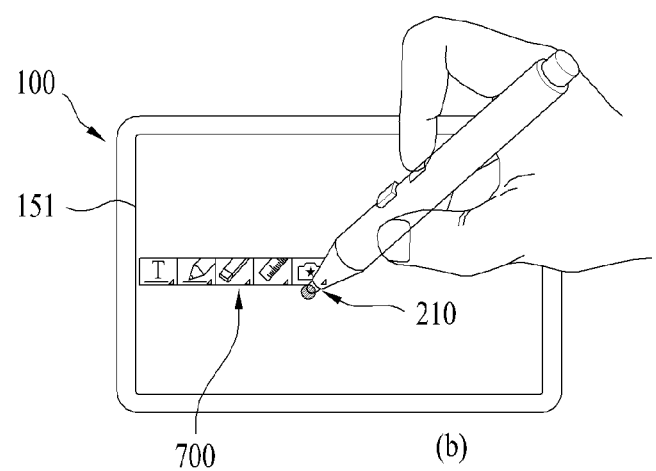
(b)

FIG. 8
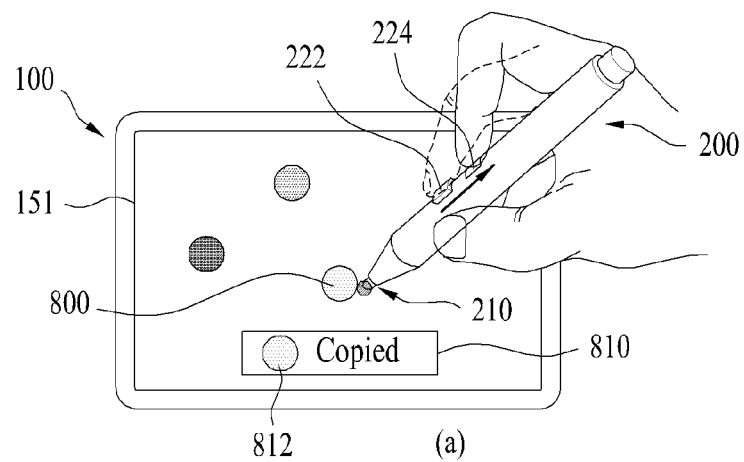
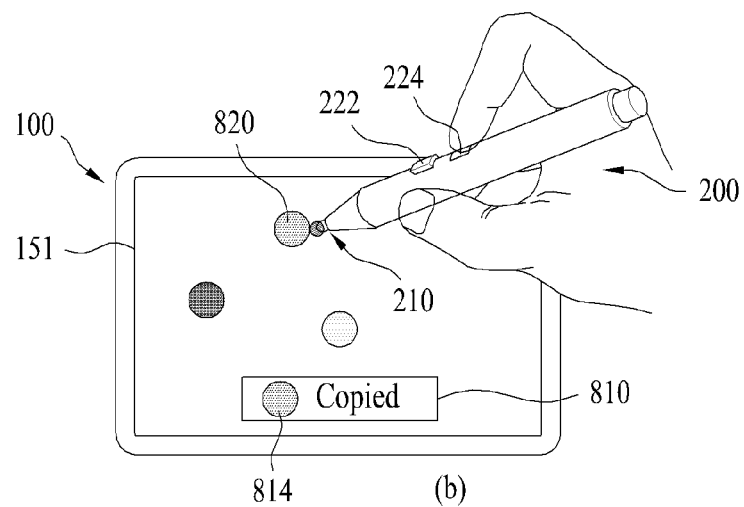

FIG. 9
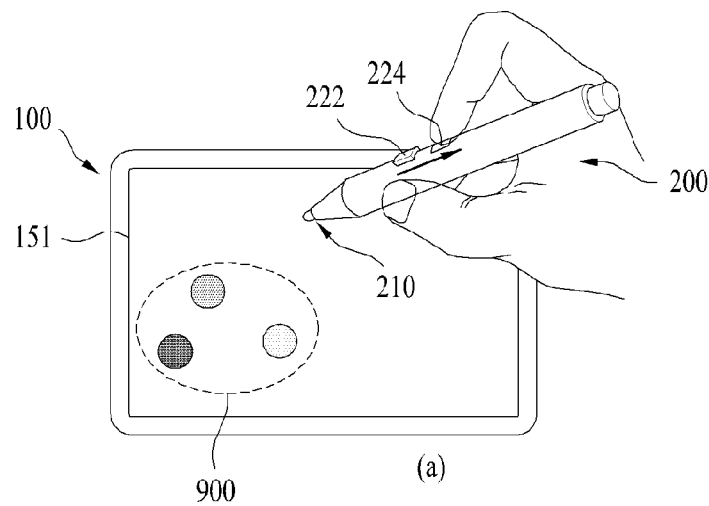
(a)
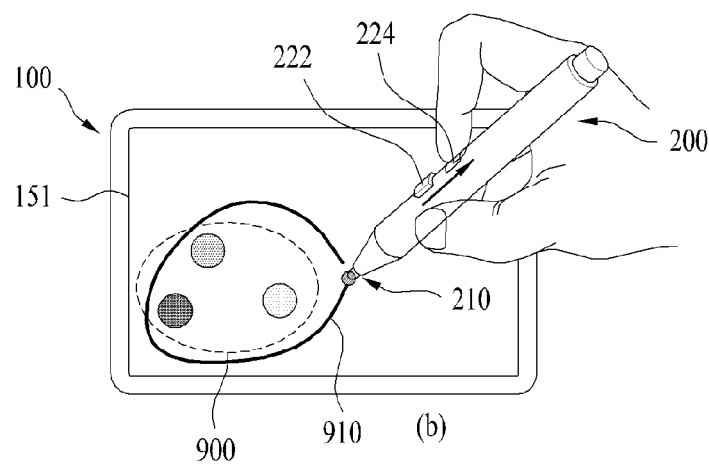
(b)
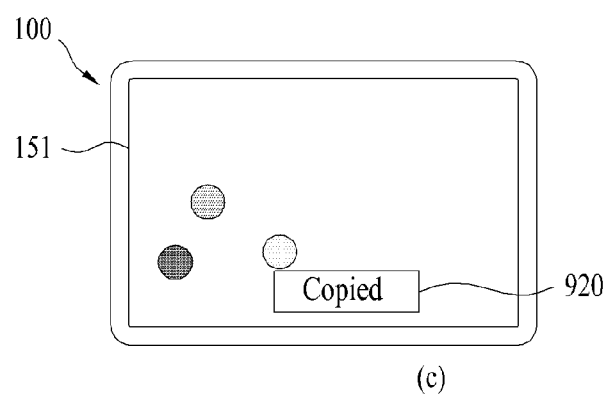
(c)

FIG. 10
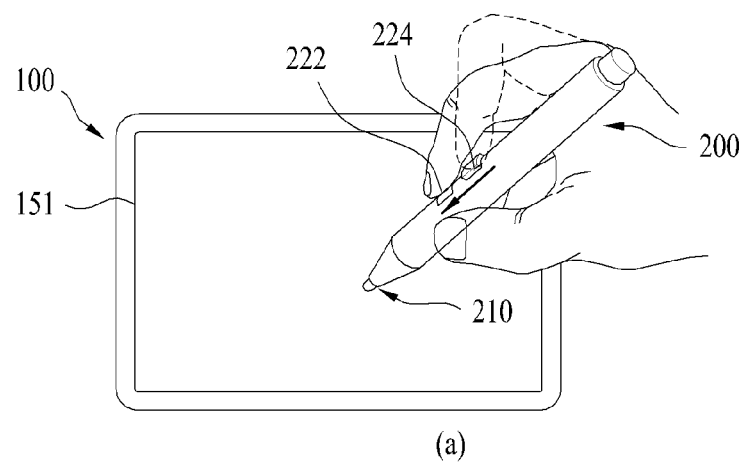
(a)
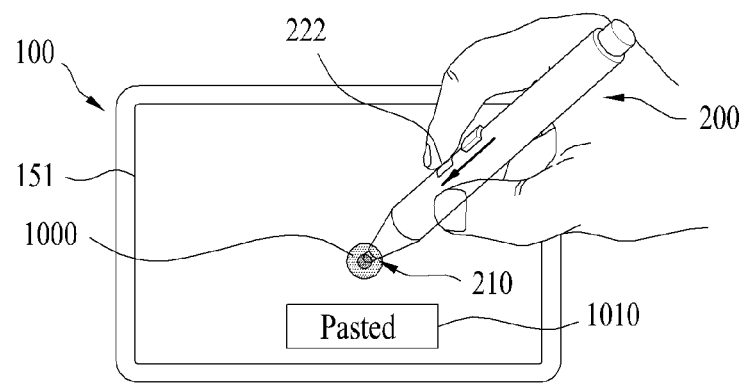
(b)

FIG. 11
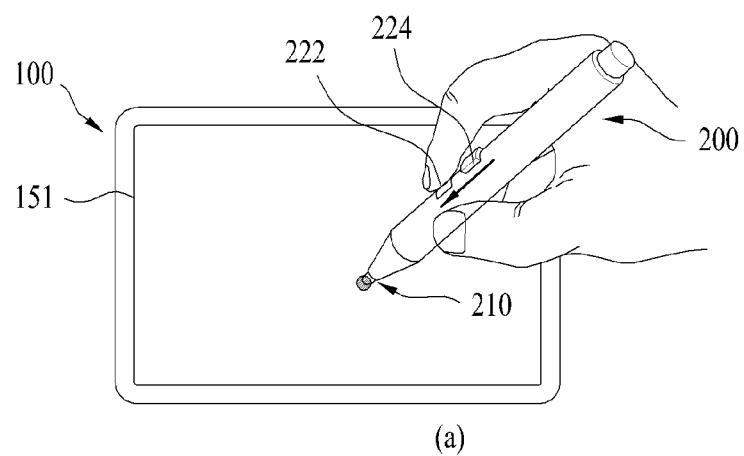
(a)
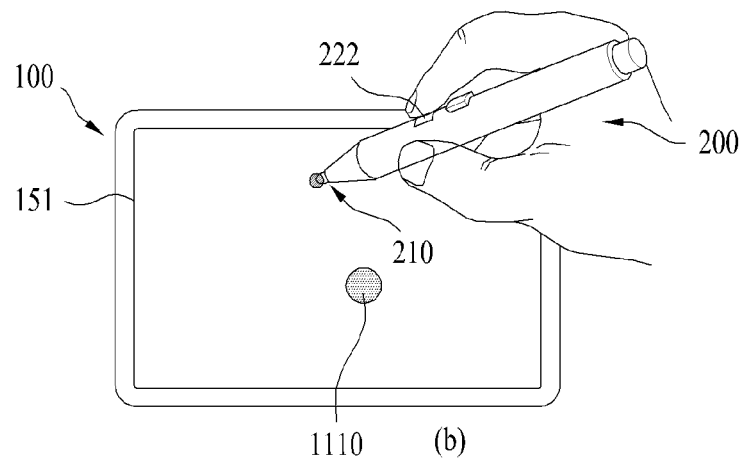
(b)

FIG. 12
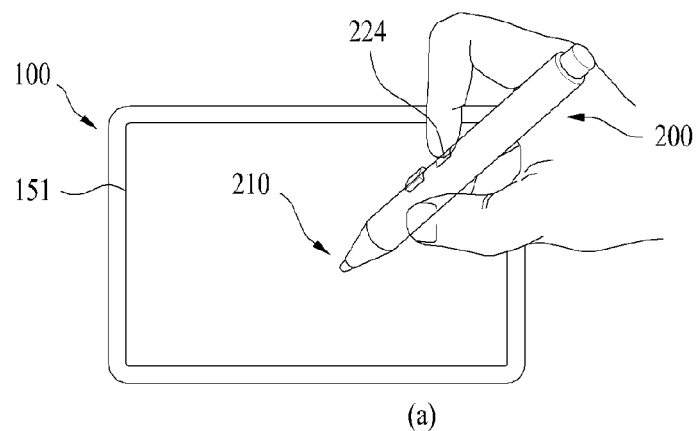
(a)
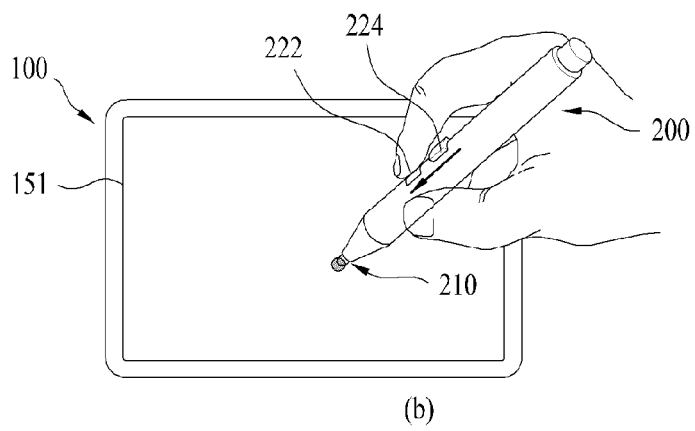
(b)
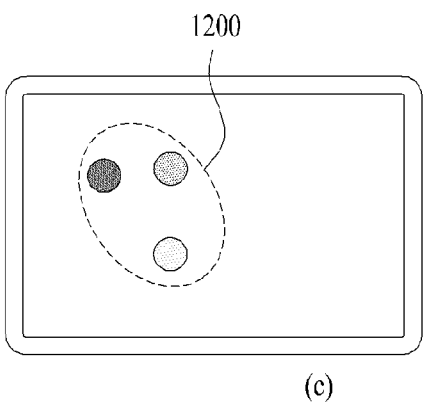
(c)

FIG. 15
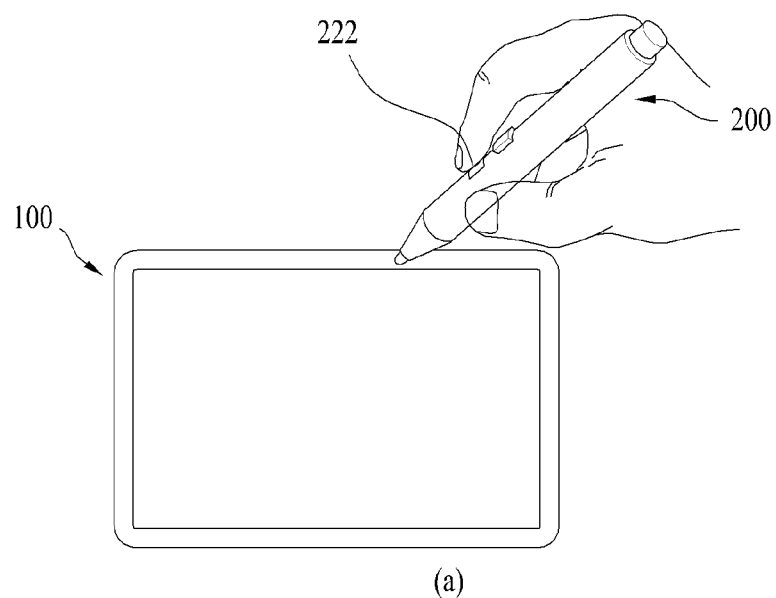
(a)
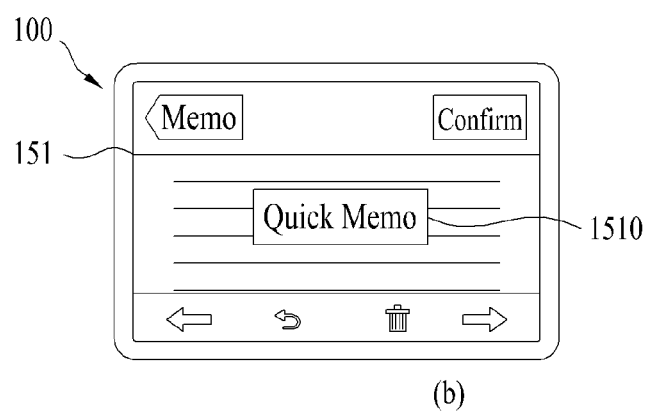
(b)

FIG. 16
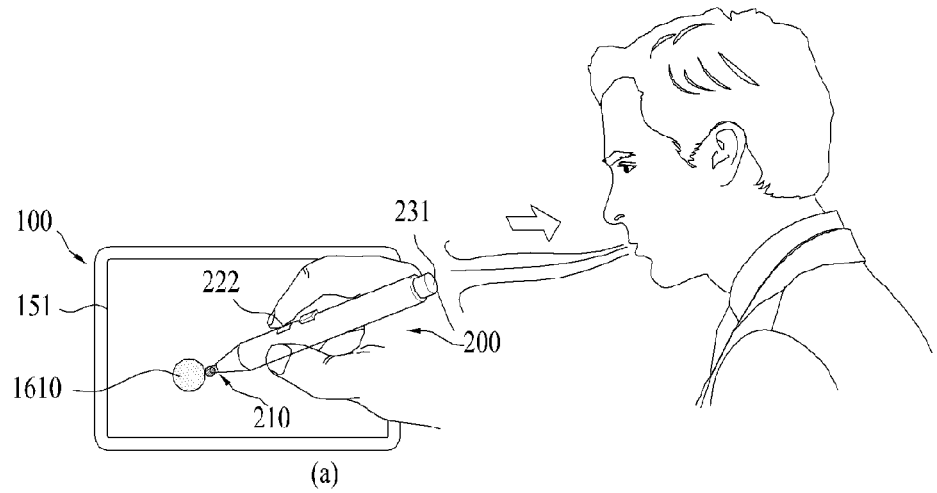
(a)
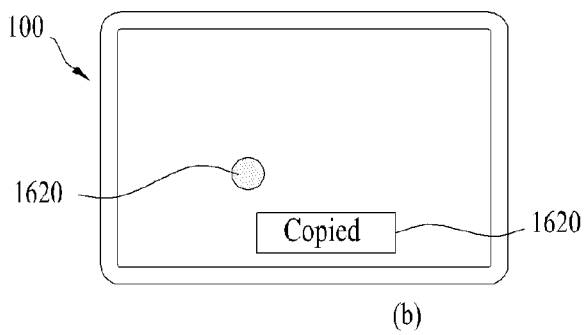
(b)
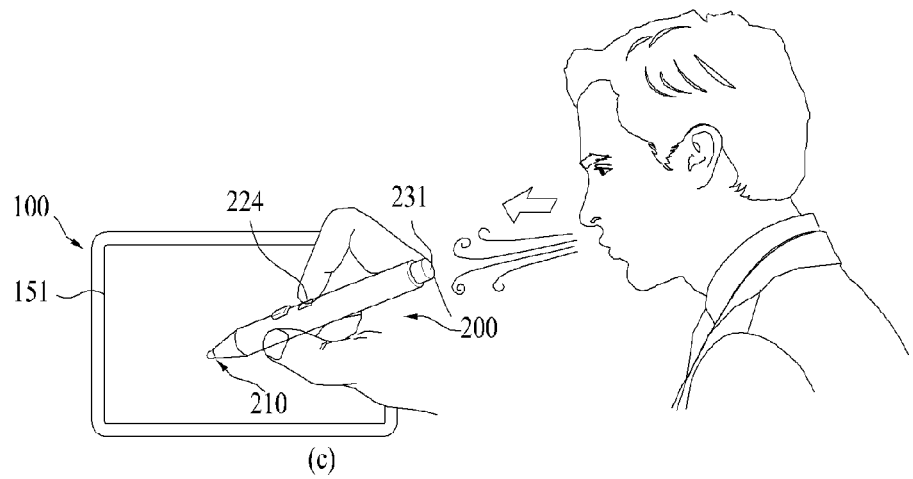
(c)
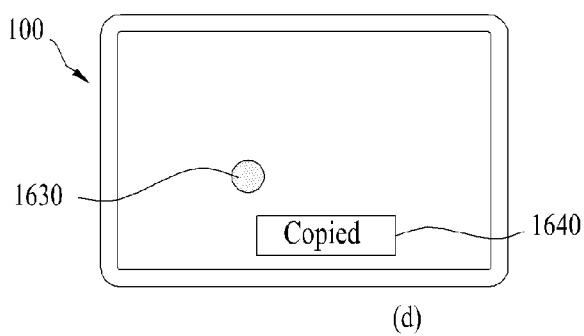
(d)

FIG. 19
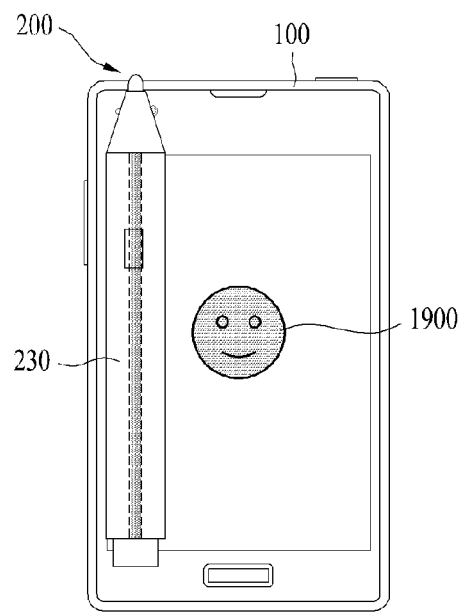
(a)
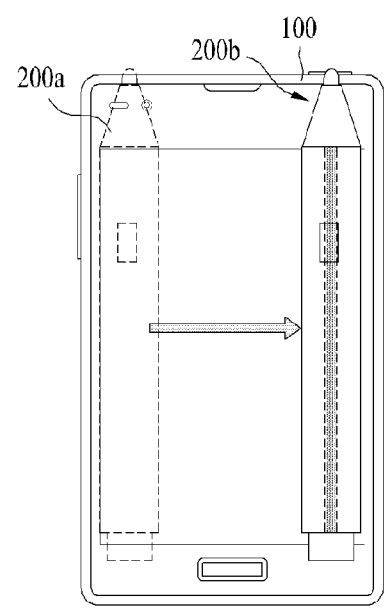
(b)
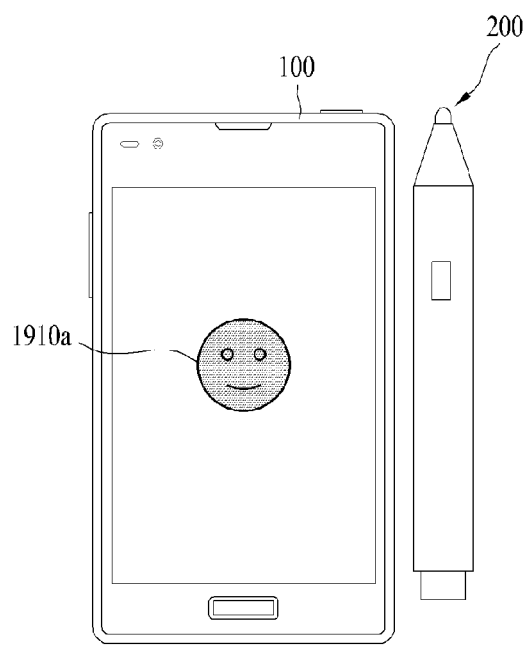
(c)
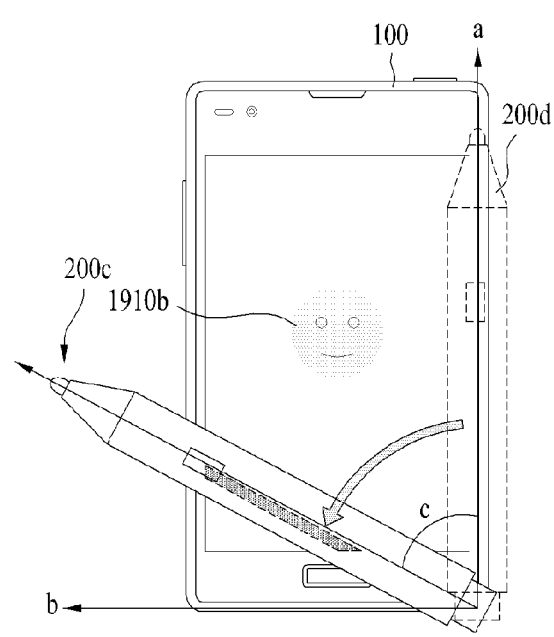
(d)

FIG. 22
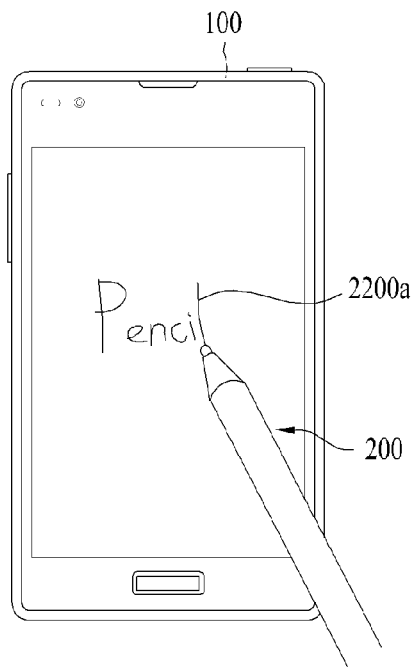
(a)
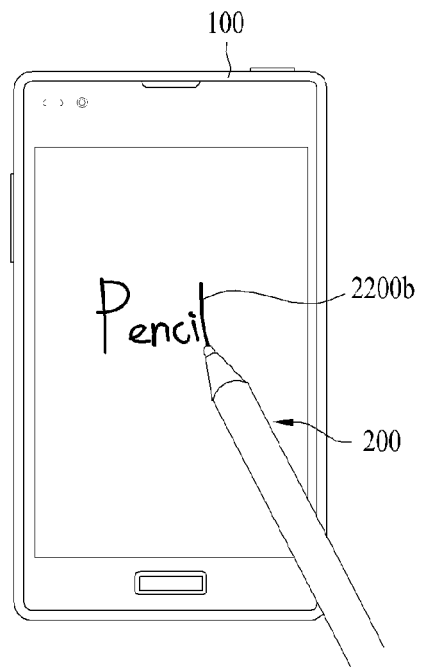
(b)
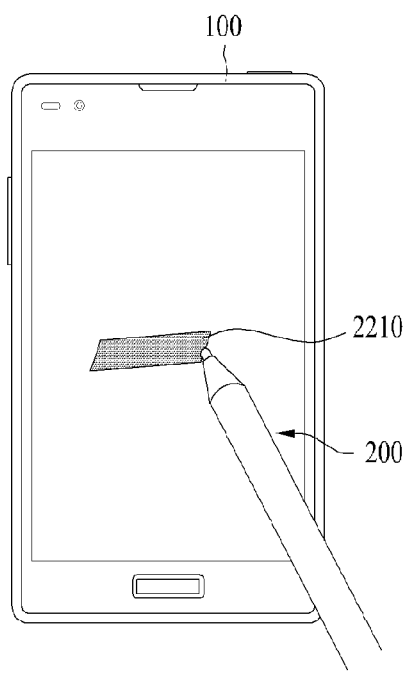
(c)
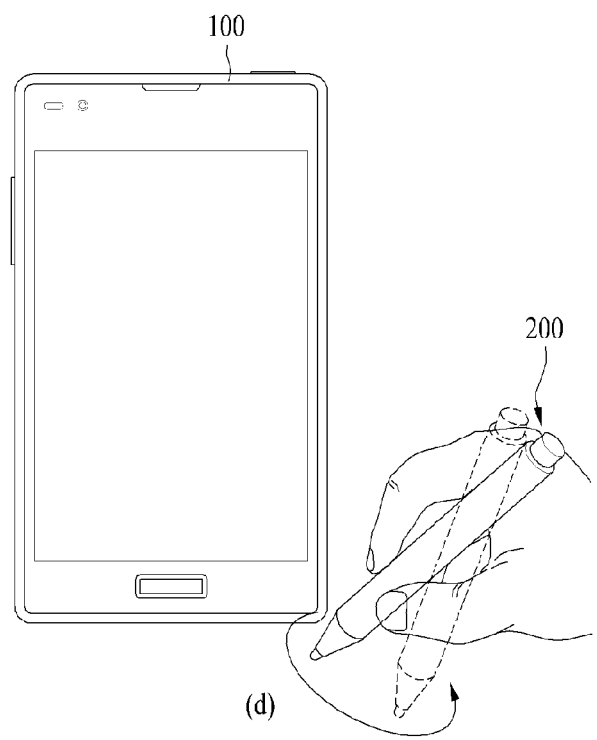
(d)

FIG. 23
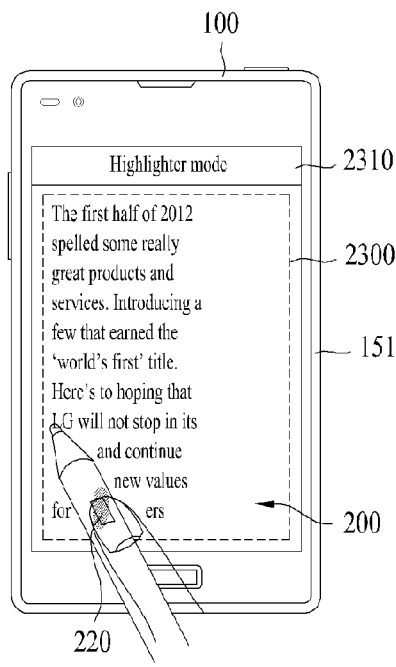
(a)
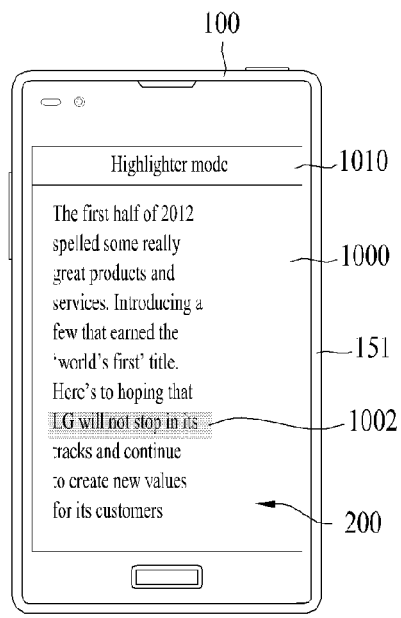
(b)
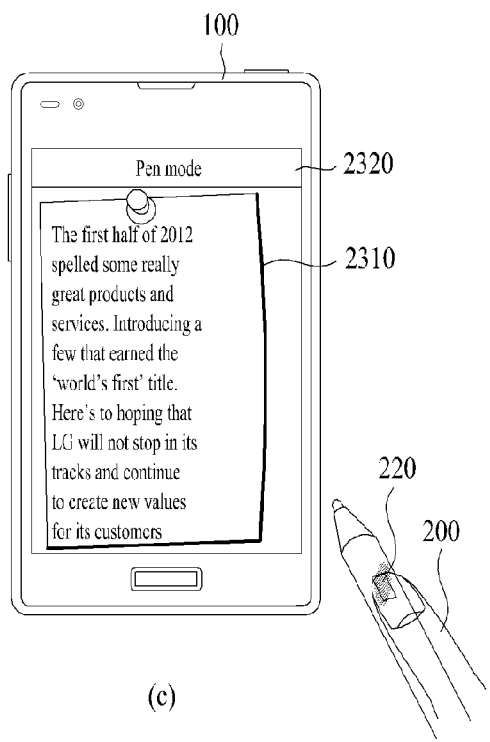
(c)
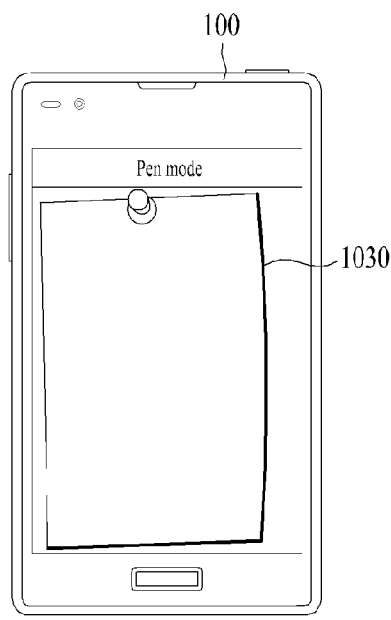
(d)

FIG. 24
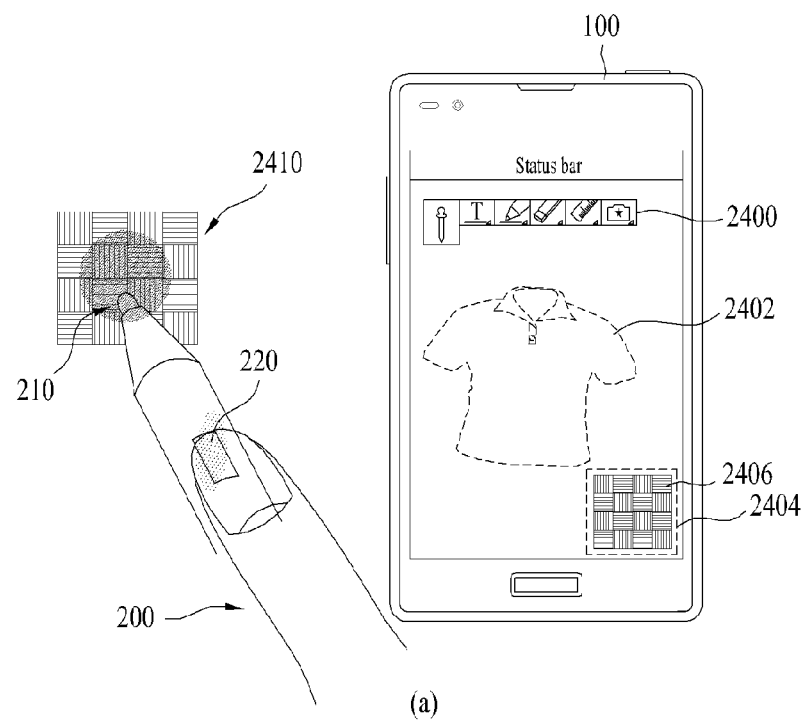
(a)
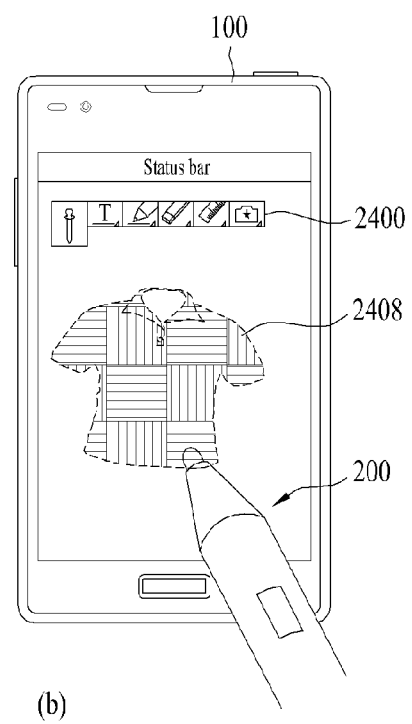
(b)

FIG. 25
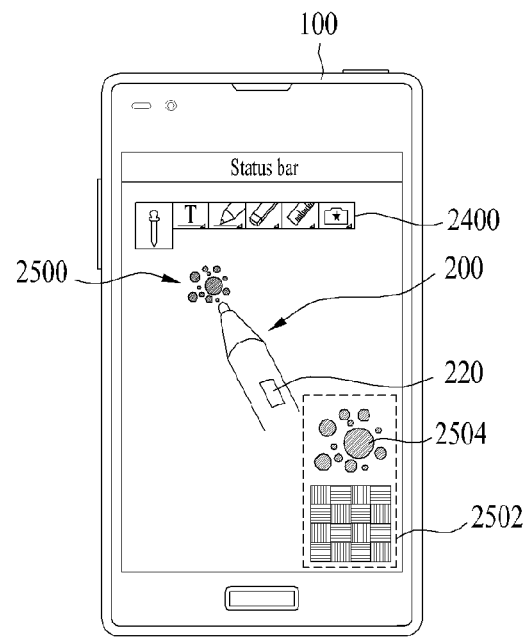
(a)
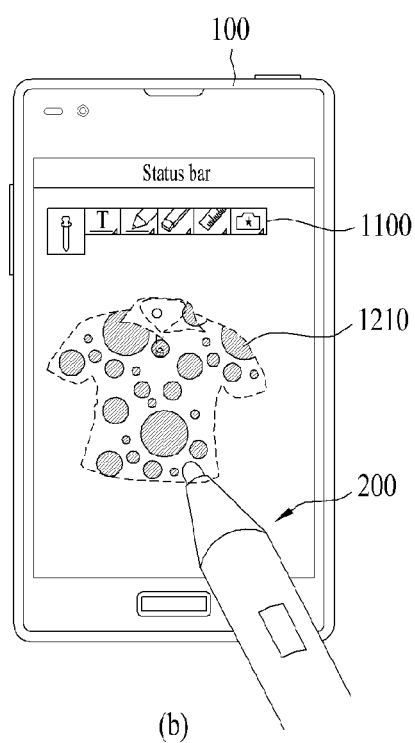
(b)

FIG. 26
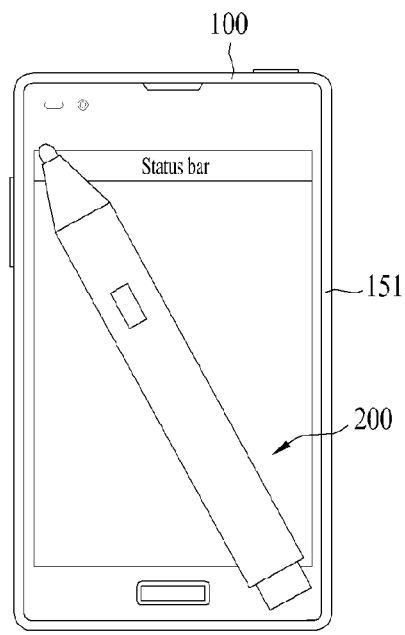
(a)
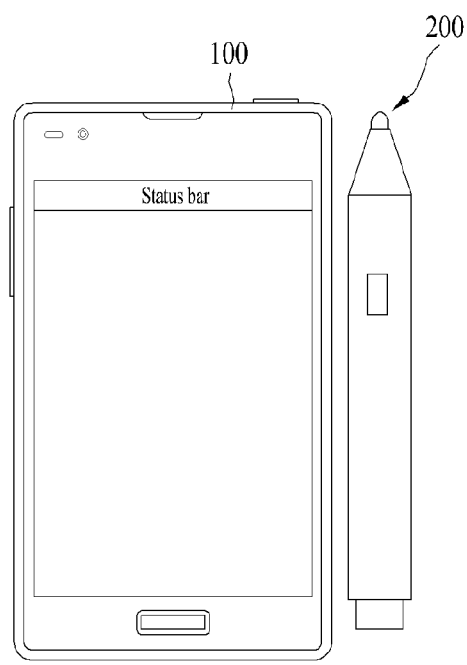
(b)

MOBILE TERMINAL AND CONTROLLING METHOD THEREOF

Pursuant to 35 U.S.C. §119(a), this application claims the benefit of earlier filing date and right of priority to Korean Applications No. 10-2013-0009731, filed on Jan. 29, 2013 and No. 10-2013-0012173, filed on Feb. 4, 2013, the contents of which are hereby incorporated by reference herein in their entirety.

BACKGROUND OF THE INVENTION

1. Field of the Invention

The present invention relates to a mobile terminal, and more particularly, to a mobile terminal and controlling method thereof. Although the present invention is suitable for a wide scope of applications, it is particularly suitable for facilitating a terminal to be used in further consideration of user's convenience.

2. Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

However, as a recent mobile terminal tends to adopt a touch sensor using input system, when a touch input is applied using a finger, it makes a difference from a real pen input and its precision is poorer than that in drawing a picture or writing letters with a real pen. Hence, the demand for using a stylus pen to assist the touch input is increasingly rising.

SUMMARY OF THE INVENTION

Accordingly, embodiments of the present invention are directed to a mobile terminal and controlling method thereof that substantially obviate one or more problems due to limitations and disadvantages of the related art.

One object of the present invention is to provide a mobile terminal and controlling method thereof, by which a prescribed function of the mobile terminal can be performed through a button manipulation of a stylus pen and a touch input.

Another object of the present invention is to provide a mobile terminal and controlling method thereof, by which a prescribed function of the mobile terminal can be performed through an inclination variation of a stylus pen.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile terminal according to the present invention may include a short range communication unit configured to receive a plurality of different signals from a stylus pen, a touchscreen, and a controller performing a prescribed function by combining a type of a signal received from the stylus pen among a plurality of the different signals and a touch pattern of the stylus pen recognized on the touchscreen.

Preferably, the touchscreen may display at least one object. After the object has been selected by the stylus pen, if at least one of a plurality of the different signals is received, the controller may perform a function corresponding to the received signal on the selected object.

More preferably, the stylus pen may include at least two buttons. If at least one of the at least two buttons is manipulated, the stylus pen may transmit a signal corresponding to the manipulated button to the short range communication unit.

And, the at least two buttons may include a first button and a second button. If the first button is manipulated, the stylus pen may transmit a first signal. If the second button is manipulated, the stylus pen may transmit a second signal.

Moreover, after the object has been touched with the stylus pen, if the first signal and the second signal are sequentially received, the controller may copy the touched object to a clipboard.

In doing so, while a prescribed region of the touchscreen is touched with the stylus pen, if the second signal and the first signal are sequentially received, the controller may paste the object copied to the clipboard on the prescribed region.

And, the controller may paste a most recently copied object among a plurality of objects copied to the clipboard on the prescribed region.

Moreover, if a prescribed region of the touchscreen is touched with the stylus pen over a prescribed time, the controller may display at least one thumbnail corresponding to at least one object copied to the clipboard on the prescribed region.

In this case, if at least one of the displayed at least one thumbnail is touched with the stylus pen, the controller may paste the object corresponding to the touched thumbnail on the prescribed region.

On the other hand, while the prescribed region of the touchscreen is touched with the stylus pen, if the second signal is received over a prescribed time and the first signal is then received, the controller may paste a most formerly copied object among a plurality of objects copied to the clipboard on the prescribed region.

More preferably, when the controller copies the touched object to the clipboard, the controller may save a location information of the touched object on the touchscreen.

In doing so, while the touchscreen is touched with the stylus pen, if the second signal and the first signal are sequentially received, the controller may paste the object copied to the clipboard on the touchscreen in accordance with the saved location information.

On the other hand, the stylus pen may further include an inclination detecting sensor. If an inclination variation of the stylus pen is detected, the stylus pen may transmit a signal corresponding to a detected inclination to the short range communication unit. If the inclination of the stylus pen is determined as equal to or greater than a prescribed inclination based on the received inclination corresponding signal and a prescribed region of the touchscreen is touched, the controller may paste at least one of the objects copied to the clipboard on the prescribed region.

In doing so, if the inclination of the stylus pen is determined as changing plural times at least within a prescribed time based on the received inclination corresponding signal and the prescribed region of the touchscreen is touched with the stylus pen, the controller may paste at least one of the objects copied to the clipboard on the prescribed region entirely.

On the other hand, when the first signal and the second signal are sequentially received, the controller may copy at least one object displayed in a simple closed curve trace touched with the stylus pen to the clipboard.

In doing so, the controller may control the at least one object copied to the clipboard to be pasted on the touchscreen in a manner of being displayed within the simple closed curve trace.

On the other hand, a conductive body is further provided to one end portion of the stylus pen. If a current is detected from the conductive body, a signal corresponding to the detected current may be transmitted to the short range communication unit.

Moreover, when a touch to the touchscreen is recognized, if the signal corresponding to the detected current is received, the controller may determine that the recognized touch is attributed to the stylus pen.

Preferably, the touchscreen may display at least one object. After at least one of a plurality of the different signals has been received, if the object is selected by the stylus pen, the controller may perform a function corresponding to the received signal on the selected object.

In another aspect of the present invention, a method of controlling a mobile terminal according to the present invention may include the steps of receiving a plurality of different signals from a stylus pen through a short range communication unit, recognizing a touch with the stylus pen through a touchscreen, and performing a prescribed function by combining a type of a signal received from the stylus pen among a plurality of the different signals and a pattern of the recognized touch with the stylus pen.

In another aspect of the present invention, a mobile terminal according to the present invention may include a touchscreen, a short range communication unit receiving a signal corresponding to a detected inclination of a stylus pen from the stylus pen having an inclination detecting sensor and a controller performing a prescribed function by combining a touch pattern by one lateral side of a body of the stylus pen recognized on the touchscreen and the inclination of the stylus pen.

Preferably, when the inclination of the stylus pen varies, the controller may change a visual effect of an object displayed inside a trace of a touch to the touchscreen with a prescribed lateral side of the body.

Preferably, if the prescribed lateral side of the body touches the touchscreen linearly while the inclination of the stylus pen belongs to a prescribed inclination range for the touchscreen, the controller may control an object at a touched point to be displayed in a manner of being divided by taking a linearly touched point as a reference line.

More preferably, the controller may control the divided object to be displayed in a manner of being spaced apart from each other to correspond to a distance in which the prescribed lateral side of the body moves away from the reference line while the inclination of the stylus pen belongs to the prescribed inclination range.

Preferably, if the prescribed lateral side of the body touches the touchscreen linearly while the inclination of the stylus pen belongs to a prescribed inclination range for the touchscreen, the controller may control at least one object to be displayed nearby a touched point.

More preferably, if recognizing an input of a touch to a prescribed one of the at least one object while the prescribed lateral side of the body touches the touchscreen, the controller may perform a function corresponding to the touched object.

Preferably, the stylus pen may further include a pen tip. And, the controller may change a visual effect of an object displayed on the touchscreen by a touch input of the pen tip in accordance with a time taken for the pen tip to touch the touchscreen step by step.

More preferably, the pen tip may further include a touch sensor. If the touch sensor is touched, the controller may cancel the changed visual effect of the object.

More preferably, if the inclination of the stylus pen is detected, the controller may cancel the changed visual effect of the object step by step in response to a count of touch inputs of the pent tip to a visual effect cancellation object displayed on the touchscreen.

More preferably, the pen tip may further include a photoelectric device. And, the controller may control the photoelectric device to emit light to correspond to a color of the object.

In this case, the photoelectric device may be configured in one body of the pen tip.

More preferably, the stylus pen may further include a camera. And, the controller may control an image photographed through the camera to be displayed on a touch inputted part of the touchscreen.

Moreover, the camera may be configured in one body of the pen tip.

In this case, if a simple closed curve region displayed on the touchscreen is touched, the controller may control the photographed image to be displayed inside the simple closed curve region.

And, the stylus pen may further include a button. If the button is manipulated, the stylus pen may transmit a signal corresponding to the manipulated button to the short range communication unit.

In this case, if the button is manipulated, the stylus pen may activate the camera and then transmit the image photographed through the camera to the short range communication unit.

If the signal corresponding to the manipulated button is received, the controller may change the visual effect of the object.

If the signal corresponding to the manipulated button is received in the course of running a memo creating function or a picture drawing function, the controller may control a new memo or picture to be drawn on the touchscreen with the stylus pen.

If the signal corresponding to the manipulated button is received in the course of running a text reading function, the controller may highlight a text part corresponding to inputting a touch to the touchscreen with the stylus pen.

More preferably, the stylus pen may further include a grip sensor and the controller may control the visual effect of the object to be changed by a touch input of the pen tip depending on a stylus pen gripped posture sensed by the grip sensor.

In a further aspect of the present invention, a method of controlling a mobile terminal according to the present invention may include the steps of recognizing a touch input of a stylus pen to a touchscreen, receiving a signal corresponding to a detected inclination of the stylus pen from the stylus pen, and performing a prescribed function by combining a touch pattern by one lateral side of a body of the stylus pen recognized on the touchscreen and the inclination of the stylus pen.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings:

FIG. 5 is a diagram for one example to describe that a mobile terminal according to one embodiment of the present invention performs a prescribed function in response to pressing a button of a stylus pen;

FIG. 6 is a diagram for one example of a process for deleting an object displayed on a mobile terminal according to one embodiment of the present invention;

FIG. 7 is a diagram for one example of a process for selecting a pen to be displayed on a touchscreen or a tool for editing a displayed object in accordance with a drawing input of a stylus pen through a button manipulation of the stylus pen in a mobile terminal according to one embodiment of the present invention;

FIG. 8 is a diagram for one example of a process for copying an object displayed on a touchscreen using a button of a stylus pen in a mobile terminal according to one embodiment of the present invention;

FIG. 9 is a diagram for one example of a process for copying an object displayed on a touchscreen using a button of a stylus pen in a mobile terminal according to another embodiment of the present invention;

FIG. 10 is a diagram for one example of a process for pasting an object copied to a clipboard in response to a button manipulation of a stylus pen in a mobile terminal according to one embodiment of the present invention;

FIG. 11 is a diagram for one example of a process for pasting an object copied to a clipboard in response to a button manipulation of a stylus pen in a mobile terminal according to another embodiment of the present invention;

FIG. 12 is a diagram for one example of a process for pasting an object copied to a clipboard in response to a button manipulation of a stylus pen in a mobile terminal according to further embodiment of the present invention;

FIG. 15 is a diagram for one example of a process for activating a prescribed function through a button manipulation of a stylus pen in a mobile terminal according to one embodiment of the present invention;

FIG. 16 is a diagram for one example of a process for performing a prescribed function in response to a wind detected by a stylus pen in a mobile terminal according to one embodiment of the present invention;

FIG. 19 is a diagram for one example of a process for performing a prescribed function in response to a touch input using a stylus pen in a mobile terminal according to another embodiment of the present invention;

FIG. 22 is a diagram for one example of a process for changing a visual effect of a displayed object in response to a touch input depending on a stylus pen touched time in a mobile terminal according to one embodiment of the present invention;

FIG. 23 is a diagram for one example of a process for receiving a button press signal from a stylus pen and performing a prescribed function in response to the button press signal in a mobile terminal according to one embodiment of the present invention;

FIG. 24 and FIG. 25 are diagrams of screens of the touchscreen 151 for outputting and using an image photographed with of a stylus pen according to one embodiment of the present invention.

FIG. 26 is a diagram for one example of a process for disabling a backlight unit of a touchscreen using a stylus pen in a mobile terminal according to one embodiment of the present invention.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile terminals, such as mobile phones, user equipment, smart phones, mobile computers, digital broadcast terminals, personal digital assistants, portable multimedia players (PMP) and navigators.

Figure 1:
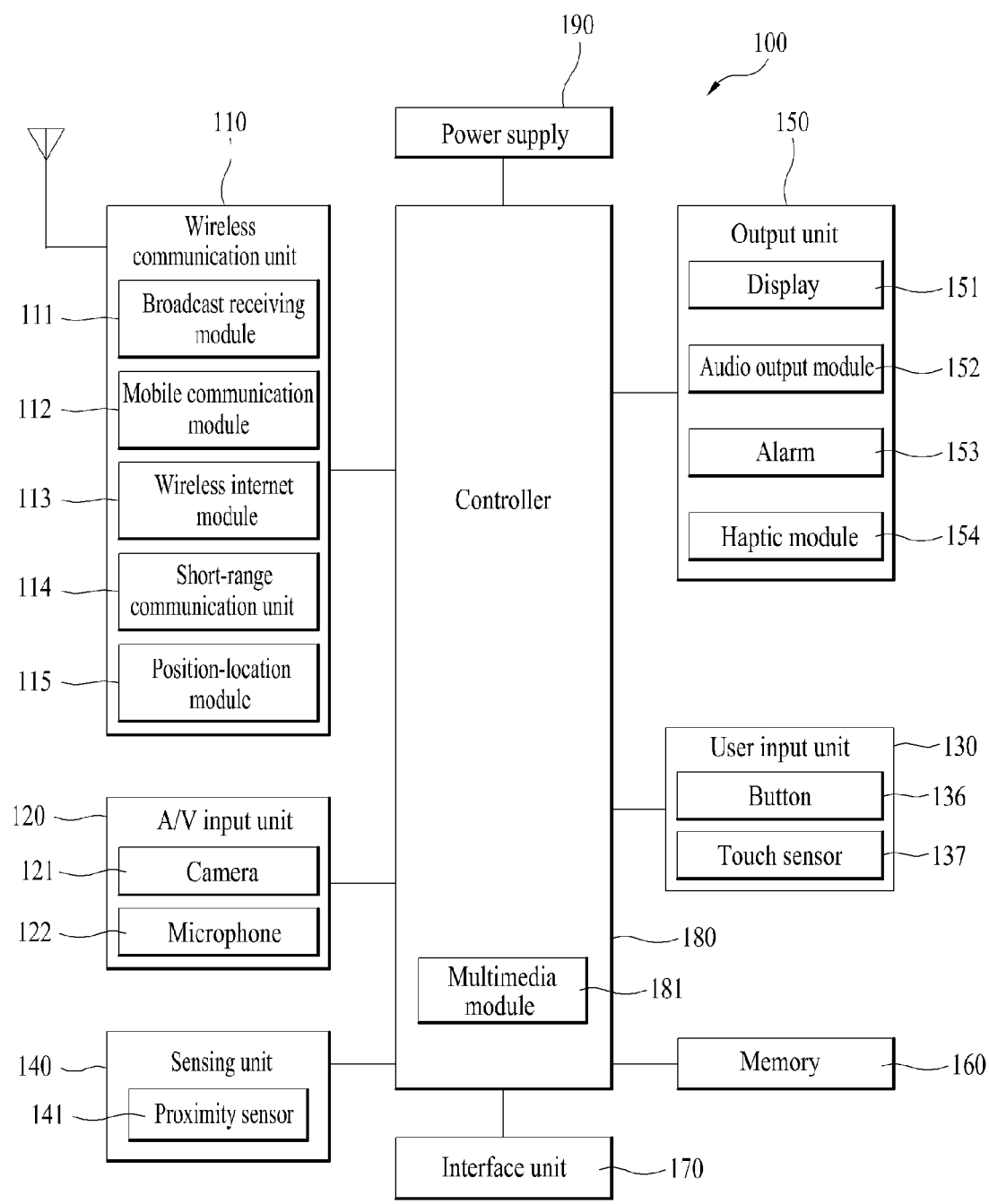
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

At least two broadcast receiving modules 111 can be provided to the mobile terminal 100 in pursuit of simultaneous receptions of at least two broadcast channels or broadcast channel switching facilitation.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), DVB-CBMS, OMA-BCAST, the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM(Global System for Mobile communications), CDMA(Code Division Multiple Access), WCDMA (Wideband CDMA) and so on. Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN(Wireless LAN) (Wi-Fi), Wibro (Wireless broadband), Wimax (World Interoperability for Microwave Access), HSDPA(High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

According to the current technology, the GPS module 115 is able to precisely calculate current 3-dimensional position information based on at least one of longitude, latitude and altitude and direction (or orientation) by calculating distance information and precise time information from at least three satellites and then applying triangulation to the calculated information. Currently, location and time informations are calculated using three satellites, and errors of the calculated location position and time informations are then amended using another satellite. Besides, the GPS module 115 is able to calculate speed information by continuously calculating a real-time current location.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100, and free-falling of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and a sensor for detecting a touch action (hereinafter called 'touch sensor') configures a mutual layer structure (hereinafter called 'touchscreen'), it is able to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIG. 1, a proximity sensor (141) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display unit 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectable to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern (or image) recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2:
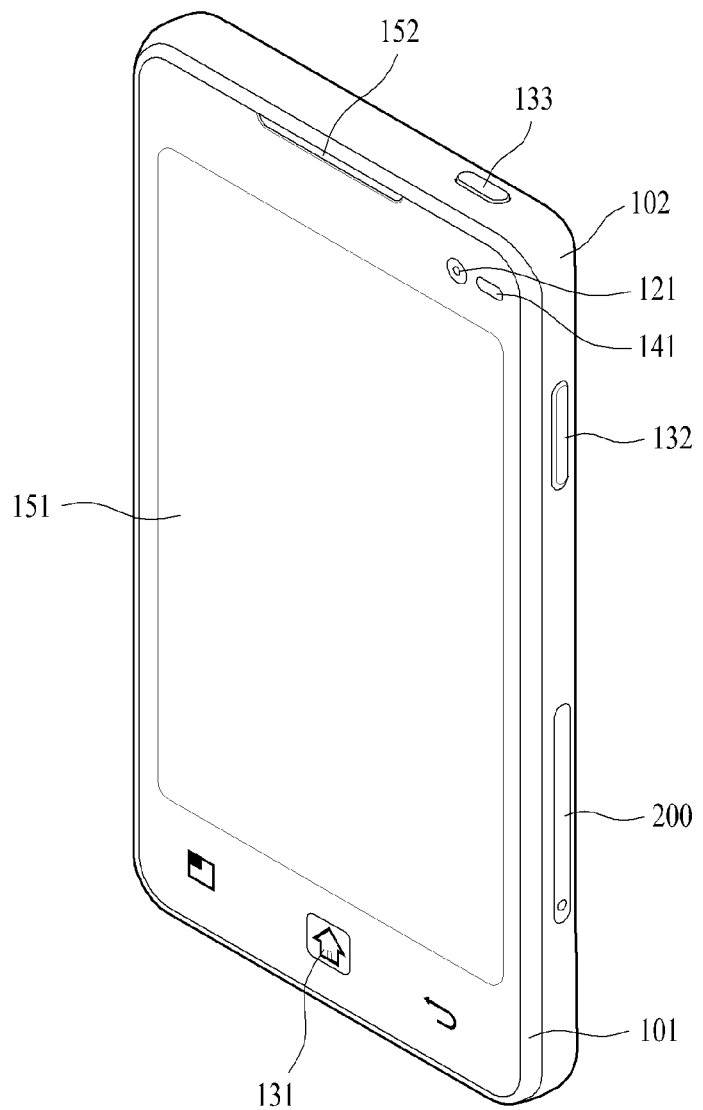
FIG. 2 is a front perspective diagram of a mobile terminal according to one embodiment of the present invention.

FIG. 2 is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the terminal body, and more particularly, to the front case 101.

The display 151 occupies most of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display 151 or the like can be inputted to the second manipulating unit 132.

FIG. 2 is a perspective diagram of a backside of the terminal shown in FIG. 2.

Referring to FIG. 2, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2 and may be used for implementation of a speakerphone mode in talking over the terminal.

A broadcast signal receiving antenna 124 can be additionally provided to the lateral side of the terminal body as well as an antenna for communication or the like. The antenna 124 constructing a portion of the broadcast receiving module 111 shown in FIG. 1 can be retractably provided to the terminal body.

A power supply unit 190 for supplying a power to the terminal 100 is provided to the terminal body. And, the power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transmittive type like the display 151. In this case, if the display 151 is configured to output visual information from its both faces, it is able to recognize the visual information via the touchpad 135 as well. The information outputted from both of the faces can be entirely controlled by the touchpad 135. Alternatively, a display is further provided to the touchpad 135 so that a touchscreen can be provided to the rear case 102 as well.

The touchpad 135 is activated by interconnecting with the display 151 of the front case 101. The touchpad 135 can be provided in rear of the display 151 in parallel. The touchpad 135 can have a size equal to or smaller than that of the display 151.

In the following description, a configuration for providing the aforesaid projector module to the slider type mobile terminal 100 is further explained with reference to FIG. 3A and FIG. 3B.

FIG. 3A and FIG. 3B are perspective diagrams of a mobile terminal according to another embodiment of the present invention.

Referring to FIG. 3A and FIG. 3B, In a mobile terminal 100, a projector body 227 having a projector module 155 is rotatably assembled to a first body 200 loaded with a display unit 151. As mentioned in the foregoing description, a second body 205 can be assembled to the first body 200 in a manner of sliding relative to the first body 200.

Referring to FIG. 3A, while the second body 205, which is assembled to the first body 200 to slide relative thereto, is in the open position, the projector body 227 rotatably assembled to the first body 200 is rotated. The projector body 227 can be hinged to the first body 200. And, it is able to adjust a projection angle of the projector body 227 in case of projecting a picture or image using the projector 155 provided to the projector body 227. And, a camera 121 can be provided to the projector body 227 to photograph the image or picture projected by the projector 155.

Referring to FIG. 3B, the first and second bodies 200 and 205 shown in FIG. 3A return to the closed position and the projector body 227 also return to an original position.

The present invention relates to a mobile terminal 100 and controlling method thereof, by which prescribed functions of the mobile terminal 100 can be conveniently performed using a stylus pen. In the following description, a stylus pen for enabling the mobile terminal 100 to perform a prescribed function is explained.

Figure 3:
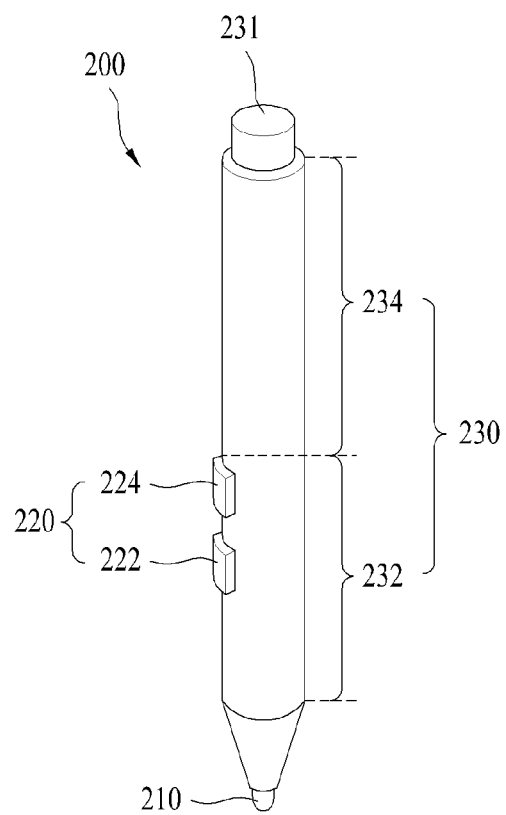
FIG. 3 is a diagram for one example of a stylus pen connected to a mobile terminal according to one embodiment of the present invention by short range communications.

FIG. 3 is a diagram for one example of a stylus pen 200 connected to the mobile terminal 100 according to one embodiment of the present invention by short range communications.

Referring to FIG. 3, a pen tip 210 may be provided to one end of a stylus pen 200 according to the present invention. And, the pen tip 210 may vary depending on an input system of the touch sensor 137. If the touch sensor 137 adopts a pressure sensitive system of sensing a pressure, it is able to use the pen tip 210 having a prescribed thickness to apply a pressure to an accurate location irrespective of materials. If the touch sensor 137 adopts an electrostatic system for sensing a variation of capacitance, it is able to use the pen tip 210 made of conductive materials.

Moreover, if the touch sensor 137 adopts the pressure sensitive system, the stylus pen 200 may include a sensor (not shown in the drawing) configured to sense a pressure applied to the pen tip 210 when the pen tip 210 comes in contact with the touchscreen 151. Hence, when a touch input is applied to the touchscreen 151 by the stylus pen 200, the controller 180 can determine the touch input by the tip of the stylus pen 200 based on a signal generated from the sensor (not shown in the drawing).

If the touch sensor 137 adopts the electrostatic system, the stylus pen 200 may include a sensor (not shown in the drawing) configured to sense a current flowing through a conductive material of the pen tip 210 when the pen tip 210 comes in contact with the touchscreen 151. Hence, when a touch input is applied to the touchscreen 151 by the stylus pen 200, the controller 180 can determine the touch input by the tip of the stylus pen 200 based on a signal generated from the sensor (not shown in the drawing).

Referring to FIG. 3, at least one or more buttons 222 and 224 can be provided to a lateral side of the stylus pen 200. If the at least one button 222/224 is pressed, a button press signal can be generated. For instance, if the first button 222 is pressed, a first signal is generated. For another instance, if the second button 224 is pressed, a second signal is generated. If both of the first button 222 and the second button 224 are simultaneously pressed, both of the first signal and the second signal may be simultaneously generated.

The stylus pen 200 can further include an inclination detecting sensor (not shown in the drawing) configured to detect an inclination of the stylus pen 200. In particular, the inclination detecting sensor detects the inclination of the stylus pen 200 and is then able to convert the detected inclination to digital data.

The inclination detecting sensor may include at least one of a position detecting sensor, a speed detecting sensor, an acceleration sensor, a gyroscopic sensor and the like, by which the present invention may be non-limited.

For instance, the inclination detecting sensor senses inclinations of 6 axes of the stylus pen 200 and then generates the sensed inclination value into a signal transmitted to the mobile terminal 100.

If the touch sensor 137 adopts the pressure sensitive system for sensing a pressure, a body 230 of the stylus pen 200 can have a prescribed thickness irrespective of materials. If the touch sensor 137 adopts the electrostatic system for sensing a variation of capacitance, the body 230 of the stylus pen 200 may be made of conductive materials.

The body 230 of the stylus pen 200 may be divided into a first part 232 including one end connected to the pen tip 210 and a second part 234 including the other end. And, the stylus pen 200 may further include a grip sensor (not shown in the drawing) configured to sense a position of holding or gripping the body 230 of the stylus pen 200.

In particular, the grip sensor recognizes a user's touch input to each of the first part 232 and the second part 234 and is then able detect the touch input recognized position. Hence, the controller 180 can determine a shape of the touch input for gripping the body 230 of the stylus pen 200.

A wind detecting sensor 231 is located on the other end opposite to the pen tip 210 of the stylus pen 200. In particular, the wind detecting sensor 231 detects a direction and speed of a wind and can convert the detected direction and speed to digital data.

The stylus pen 200 can include a short range communication module (not shown in the drawing) configured to transmit signals to the mobile terminal 100. This short range communication module transmits a button press signal generated from pressing the at least one button 222/224, a signal generated from the sensor configured to detect a pressure applied to the pen tip 210, a signal generated from the sensor configured to detect a current flowing through a conductive material, digital data converted by the inclination detecting sensor or digital data converted by the wind detecting sensor 231 to the mobile terminal 100. The signal or data can be received by the wireless communication unit 110 of the mobile terminal 100. The signal transmission to the mobile terminal 100 from the stylus pen 200 is normally performed while the mobile terminal 100 is in use. Hence, it is able to use the short range communication unit 114 of the mobile terminal 100 because the mobile terminal 100 and the stylus pen 200 are not spaced apart from each other in a considerable distance.

In the following description, a method of controlling the mobile terminal depending on a type of a signal generated by the button 220 provided to the stylus pen 200 and a touch input pattern is explained in detail with reference to FIG. 4.

Figure 4:
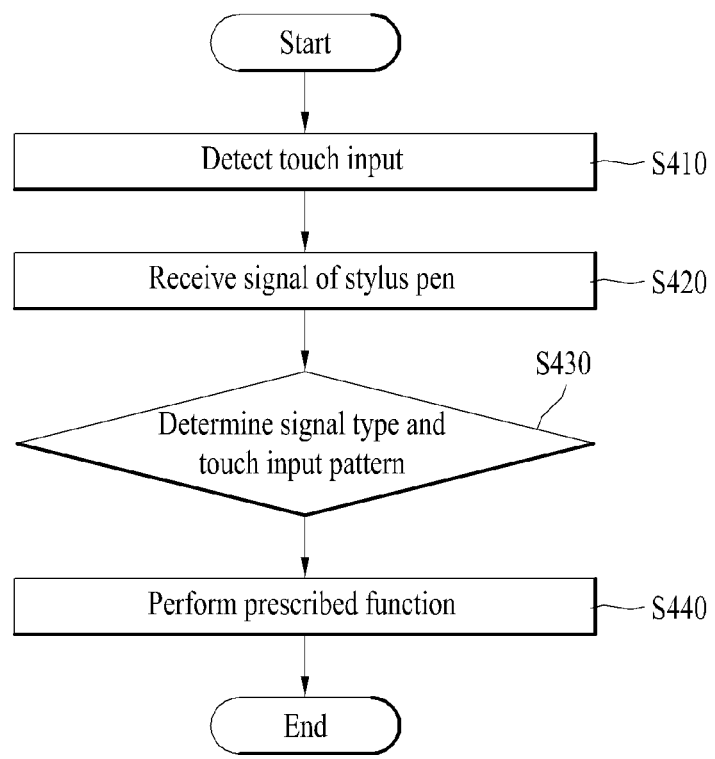
FIG. 4 is a flowchart for a method of controlling a mobile terminal according to one embodiment of the present invention.

FIG. 4 is a flowchart for a method of controlling the mobile terminal 100 according to one embodiment of the present invention.

Referring to FIG. 4, the controller 180 detects a touch input to the touchscreen 151 [S410]. In particular, the controller 180 can detect a touch input applied once to a prescribed point on the touchscreen 151 or a trace of a touch input applied to the touchscreen 151.

The short range communication unit 114 receives a press signal of the button 220 of the stylus pen 200 [S420]. In particular, the signal generated from pressing the first button 222 or the second button 224 of the stylus pen 200 can be received by the short range communication unit 114. If so, the short range communication unit 114 can output the received signal to the controller 180.

Optionally, the step S410 and the S420 may be simultaneously performed or the step S420 may be performed prior to the step S410.

Subsequently, the controller 180 determines a type of the signal received from the stylus pen 200 and a pattern of the touch input detected from the touchscreen 151 [S430].

The controller 180 can determine which one of the touch input and the signal reception occurs in advance. For instance, the controller 180 can determine whether the first signal is received after the touch to the touchscreen 151 or the touchscreen 151 is touched after the reception of the first signal.

If the touch input is recognized for prescribed duration, the controller 180 can determine whether a signal is received from the stylus pen 200. On the contrary, after a signal of the same type has been received for prescribed duration from the stylus pen 200, the controller 180 can determine whether a touch input is detected.

If signals of different types are sequentially received, the controller 180 can determine the order of the signal receptions and the types of the received signals. For instance, the controller 180 can determine whether the first signal is received after reception of the second signal.

The controller 180 can determine a touch inputted point and a trace of a touch input. For instance, the controller 180 determines whether the trace of the touch input is a simple closed curve and is then able to determine an object displayed inside the simple closed curve.

The controller 180 can determine an inclination change of the stylus pen 200 from the received signal. For instance, the controller 180 can determine whether the inclination of the stylus pen 200 changed over a prescribed range. And, the controller 180 can determine whether the inclination of the stylus pen 200 changed over plural times in a prescribed period.

And, the controller 180 can determine a direction and speed of a wind detected by the wind detecting sensor 231 from the received signal. For instance, the controller 180 can determine whether a wind is inflow or outflow using the wind detecting sensor 231 of the stylus pen 200.

Thereafter, the controller 180 performs a prescribed function in accordance with the determined signal and the determined touch input pattern [S440]. This step is described in detail with reference to FIG. 5 as follows.

FIG. 5 is a diagram for one example to describe that the mobile terminal 100 according to one embodiment of the present invention performs a prescribed function in response to pressing the button 220 of the stylus pen 200.

Referring to FIG. 5 (a), a user grips the stylus pen 200 with a hand and is then able to apply a touch input to the touchscreen 151 of the mobile terminal 100 using the pen tip 210 of the stylus pen 200.

If so, the controller 180 can perform a prescribed function in accordance with the detected touch input. For instance, when the mobile terminal 100 is in drawing mode, the controller 180 can display an object corresponding to a trace of the touch input on the touchscreen 151. In particular, assume that the displayed object includes a line 510 drawn with a pen of a first type.

In doing so, if the short range communication unit 114 receives a signal, which was generated from pressing the first button 222 of the stylus pen 200, at least once, the controller 180 can change a type of a pen displayed on the touchscreen 151 by a touch input. In particular, if the first button 222 is pressed, a trace of the touch input, which will be displayed on the touchscreen 151, can be changed.

For instance, if the short range communication unit 114 receives the signal of pressing the first button 222 once, referring to FIG. 5 (b), the controller 180 can display a trace of a touch to the touchscreen 151 by changing the pen of the first type into a pen of a second type. Hence, a trace 520 drawn with the pen of the second type can be displayed on the touchscreen 151 in accordance with a user's touch input.

For another instance, if the short range communication unit 114 receives the signal of pressing the first button 222 twice in sequence, referring to FIG. 5 (c), the controller 180 can display a trace of a touch to the touchscreen 151 by changing the pen of the first type into a pen of a third type. Hence, a trace 530 drawn with the pen of the third type can be displayed on the touchscreen 151 in accordance with a user's touch input.

Therefore, the controller 180 can change a type of an object, which will be displayed to correspond to a trace of a touch input to the touchscreen 151, depending on a count of receptions of the signal of pressing the first button 222.

In the following description, a method of deleting an object displayed on a screen in response to pressing the second button 224 is explained in detail with reference to FIG. 6.

FIG. 6 is a diagram for one example of a process for deleting an object displayed on the mobile terminal 100 according to one embodiment of the present invention.

Referring to FIG. 6 (a), a plurality of objects 610 and 612 can be displayed on the touchscreen 151. In doing so, while a signal of pressing the second button 224 of the stylus pen 200 is received, if a touch to at least one (e.g., the object 612) of the displayed objects 610 and 612 is recognized, the controller 180 can change the touched object 612.

The short range communication unit 114 receives a signal of pressing the second button 224 and the controller 180 is able to determine the object 612 displayed at the touched point on the touchscreen 151. While the second signal is received, if the object 612 displayed on the touchscreen 151 is touched, the controller 180 can perform a function related to the touched object 612.

For instance, if 'l' 610 and 'G' 612 are displayed on the touchscreen 151, a user can touch the 'G' 612 with the pen tip 210 of the stylus pen 200 while pressing the second button 224 of the stylus pen 200.

If so, referring to FIG. 6 (b), the controller 180 can delete the object 'G' 612 by the function related to the touched object. In doing so, the controller 180 may further display an indication text 620 indicating that the touched object 612 has been deleted as well as delete the touched object 612. Moreover, the controller 180 can display a thumbnail (not shown in the drawing) of the deleted object 612 together with the indication text 620.

On the other hand, user can touch the 'L' 610 with the pen tip 210 of the stylus pen 200 while pressing the second button 224 of the stylus pen 200. If so, referring to FIG. 6 (c), the controller 180 can delete the object 'L' 610 by the function related to the touched object. In doing so, the controller 180 may further display an indication text 620 indicating that the touched object 610 has been deleted as well as delete the touched object 610.

In the following description, a method of displaying a menu related to an object in response to pressing the first button 222 and/or the second button 224 is explained in detail with reference to FIG. 7.

FIG. 7 is a diagram for one example of a process for selecting a pen to be displayed on the touchscreen 151 or a tool for editing a displayed object in accordance with a drawing input of the stylus pen 200 through a manipulation of the button 220 of the stylus pen 200 in the mobile terminal 100 according to one embodiment of the present invention.

Referring to FIG. 7 (a), a user presses the first button 222, the second button 224 and the first button 122 in sequence. If so, the stylus pen 200 can transmit a first signal, a second signal and the first signal to the mobile terminal 100 in sequence in response to the user's inputs.

After the signals have been sequentially received, if the touchscreen 151 is touched with the stylus pen 200, referring to FIG. 7 (b), the controller 180 can display a tool selection menu 700 at the touched point on the touchscreen 151. In particular, the controller 180 can display the tool selection menu 700 in response to a pattern of the signals received from the stylus pen 200 and the touch input.

If a touch to a pen type or tool displayed on the tool selection menu 700 is recognized, the controller 180 stops displaying the tool selection menu 700 and is then able to perform a function corresponding to the touched pen or tool in response to a touch inputted thereafter.

For instance, if the user selects a pen from the tool selection menu 700, the controller 180 can display the selected pen along a trace of a touch inputted thereafter.

For another instance, if the user selects a cutter from the tool selection menu 700, the controller 180 can cut out an image displayed on the touchscreen 151 along a trace of a touch inputted thereafter.

In the following description, a method of copying an object displayed on the touchscreen 151 is explained in detail with reference to FIG. 8.

FIG. 8 is a diagram for one example of a process for copying an object displayed on the touchscreen 151 using the button 220 of the stylus pen 200 in the mobile terminal 100 according to one embodiment of the present invention.

Referring to FIG. 8 (a), 3 objects may be displayed on the touchscreen 151.

In doing so, while a user presses the second button 224 after pressing the first button 222 of the stylus pen 200, the user can touch one 810 of the objects displayed on the screen. In particular, the stylus pen 200 transmits a first signal to the mobile terminal 100 in response to pressing the first button 222. After the first button 22 has been released, if the second button 224 is pressed, the stylus pen 200 stops the transmission of the first signal and is then able to transmit a second signal to the mobile terminal 100.

After a series of the signals have been received, if a first object 800 displayed on the touchscreen 151 is touched with the stylus pen 200, the controller 180 determines the first object 800 displayed at the touched point and is able to copy the determined first object to a clipboard. When the first object 800 is copied to the clipboard, coordinates information of the first object 800 displayed on the touchscreen 151 can be saved together.

Thereafter, when the first object 800 copied to the clipboard is pasted, it is able to paste the first object 800 in accordance with the coordinates information of the first object 800.

In this case, according to the clipboard function, prescribed data is copied and then saved temporarily. And, the saved data can be pasted in response to a user's request. Moreover, the prescribed data may include multimedia data of a graphic image, a sound, a video and the like and text data.

The controller 180 can display both an indication text 810 indicating that the first object 800 is copied to the clipboard and a thumbnail 812 of the first object 800 copied to the clipboard.

Referring to FIG. 8 (b), while the second signal keeps being received, if a second object 820 is touched, the controller 180 determines the second object 820 displayed at the touched point and is then able to copy the second object 820 to the clipboard.

After the copy is complete, the controller 180 can display both an indication text 810 indicating that the second object 820 is copied to the clipboard and a thumbnail 814 of the second object 820 copied to the clipboard.

In particular, the controller 180 can perform a function related to an object displayed on the touchscreen 151 through a pattern of signals received from the stylus pen 200 and a touch input.

In the following description, a method of copying a plurality of objects displayed on the touchscreen 151 is explained in detail with reference to FIG. 9.

FIG. 9 is a diagram for one example of a process for copying an object displayed on the touchscreen using the button 220 of the stylus pen 200 in the mobile terminal 100 according to another embodiment of the present invention.

Referring to FIG. 9 (a), 3 objects can be displayed on the touchscreen 151.

After a user has pressed the first button 222 of the stylus pen 200 and the second button 224 of the stylus pen 200 in sequence, referring to FIG. 9 (b), while the user presses the second button 224, the user touches the touchscreen 151 with the stylus pen 200 and is then able to drag the stylus pen 200 to enable the 3 objects 900 displayed on the touchscreen 151 to be included inside a trace 910 of the touch input.

Accordingly, as the first button 222 is pressed, the stylus pen 200 transmits a first signal to the mobile terminal 100. Subsequently, if the second button 224 keeps being pressed, the stylus pen 200 stops the transmission of the first signal and is then able to transmit a second signal to the mobile terminal 100 consecutively.

The short range communication unit 114 receives the signals in sequence and is then able to output the received signals to the controller 180.

While the second signal is received, if a touch input to the touchscreen 151 is recognized, the controller 180 determines the 3 objects displayed inside the trace of the touch input and is then able to copy them to a clipboard. In particular, when the 3 objects 900 are copied to the clipboard, the controller 180 can save coordinates informations of the 3 objects 900 displayed on the touchscreen 151 together.

After the copy is complete, the controller 180 can display an indication text 810 indicating that the 3 objects 900 are copied to the clipboard and thumbnails (not shown in the drawing) of the 3 objects 900 copied to the clipboard together.

In the following description, a method of pasting an object copied to a clipboard with the stylus pen 200 is explained in detail with reference to FIG. 10.

FIG. 10 is a diagram for one example of a process for pasting an object copied to a clipboard in response to a button manipulation of the stylus pen 200 in the mobile terminal 100 according to one embodiment of the present invention.

Referring to FIG. 10 (a), after the second button 224 of the stylus pen 200 has been pressed, if an input of pressing the first button 222 is received, the stylus pen 200 transmits a second signal to the mobile terminal 100 in response to pressing the second button 224 and then transmits a first signal to the mobile terminal 100 in response to pressing the first button 222.

If a touch input to a prescribed point of the touchscreen 151 is received, referring to FIG. 10 (b), the controller 180 can paste an object saved in the clipboard on the prescribed point. In doing so, the controller 180 can further display an indication text 101 indicating that the paste of the object is complete.

Meanwhile, if a plurality of objects are saved in the clipboard, a most recently saved object is determined. Subsequently, the most recently saved object can be pasted on a prescribed point of the touchscreen 151.

On the other hand, if the second button 224 keeps being pressed over a prescribed time and the first button 222 is then pressed, the stylus pen 200 transmits a second signal to the mobile terminal 100 over the prescribed time, stops the transmission of the second signal, and is then able to transmit a first signal to the mobile terminal 100. After the signals have been received, if a touch input is applied to a prescribed point of the touchscreen 151, the controller 180 determines a most previously saved object and is then able to paste the most previously saved object on the prescribed point.

In the following description, a method of pasting an object copied to a clipboard with a stylus pen 200 after inputting a touch with the stylus pen 200 is explained in detail with reference to FIG. 11.

FIG. 11 is a diagram for one example of a process for pasting an object copied to a clipboard in response to a manipulation of the button 220 of the stylus pen 200 in the mobile terminal 100 according to another embodiment of the present invention.

Referring to FIG. 11 (a), while a prescribed point of the touchscreen 151 is touched with the stylus pen 200, if a second signal and a first signal are received in sequence from the stylus pen 200, the controller 180 can paste the object copied to the clipboard on the touched prescribed point.

For instance, if a user intends to paste an object copied to the clipboard on a desired point using the pen tip 210 of the stylus pen 200, the user touches the desired point with the pen tip 210 and then applies an input in a manner of sequentially pressing the second button 224 and the first button 222, thereby pasting the object copied to the clipboard on the desired point.

If so, referring to FIG. 11 (b), the controller 180 pastes the object copied to the clipboard on the touched point and then displays the pasted object.

While the first signal keeps being received, if an input of touching the touchscreen 151 with the stylus pen 200 is recognized, the controller 180 can paste the copied object on the touch inputted point. For instance, if a user retouches the touchscreen 151 while pressing the first button 222, the controller 180 can paste the object copied to the clipboard on the touched point.

In doing so, if there is a single object previously copied to the clipboard, the controller 180 can paste the single object.

On the other hand, the controller 180 can paste objects in order by starting with an object most lately copied. For instance, in case that a first object and a second object were previously copied in order, when a first pasting is performed, the controller 180 pastes the second object. Subsequently, when a second pasting is performed, the controller 180 can paste the first object.

In the following description, a method of pasting a plurality of objects copied to a clipboard with a stylus pen 200 after inputting a touch with the stylus pen 200 is explained in detail with reference to FIG. 12.

FIG. 12 is a diagram for one example of a process for pasting an object copied to a clipboard in response to a manipulation of the button 220 of the stylus pen 200 in the mobile terminal 100 according to further embodiment of the present invention.

Referring to FIG. 12 (a), a user touches a prescribed point of the touchscreen 151 with the stylus pen 200 and is then able to press the second button 224 of the stylus pen 200 over a prescribed duration. If so, while the touch input to the prescribed point is recognized, the controller 180 can receive a second signal from the stylus pen 200 through the short range communication unit 114.

Referring to FIG. 12 (b), while the touch to the prescribed point is maintained, the user stops pressing the second button 224 and is then able to press the first button 222. If so, after the second signal has been received over a prescribed time, the reception of the second signal is stopped and the short range communication unit 114 is then able to receive a first signal.

If so, referring to FIG. 12 (c), the controller 180 can paste all objects copied to the clipboard on the touched prescribed point correspondingly.

For instance, when the user intends to paste all objects copied to the clipboard on a desired point with the pen tip 210 of the stylus pen 200, the user touches the desired point with the pen tip 210, presses the second button 224 over a prescribe duration, and then presses the first button 222, thereby pasting all object copied to the clipboard on the desired point correspondingly.

In doing so, the controller 180 can control each of the objects to be pasted on the desired point in a manner of being related to information on a location at which the object was copied. For instance, when each of the objects is copied, the controller 180 determines information of coordinates of the corresponding object displayed on the touchscreen 151. Thereafter, the controller 180 can paste each of the objects on the desired point in accordance with the corresponding coordinates information.

In the following description, a method of pasting a plurality of objects copied to a clipboard by detecting an inclination variation of a stylus pen 200 is explained in detail with reference to FIG. 13.

Figure 13:
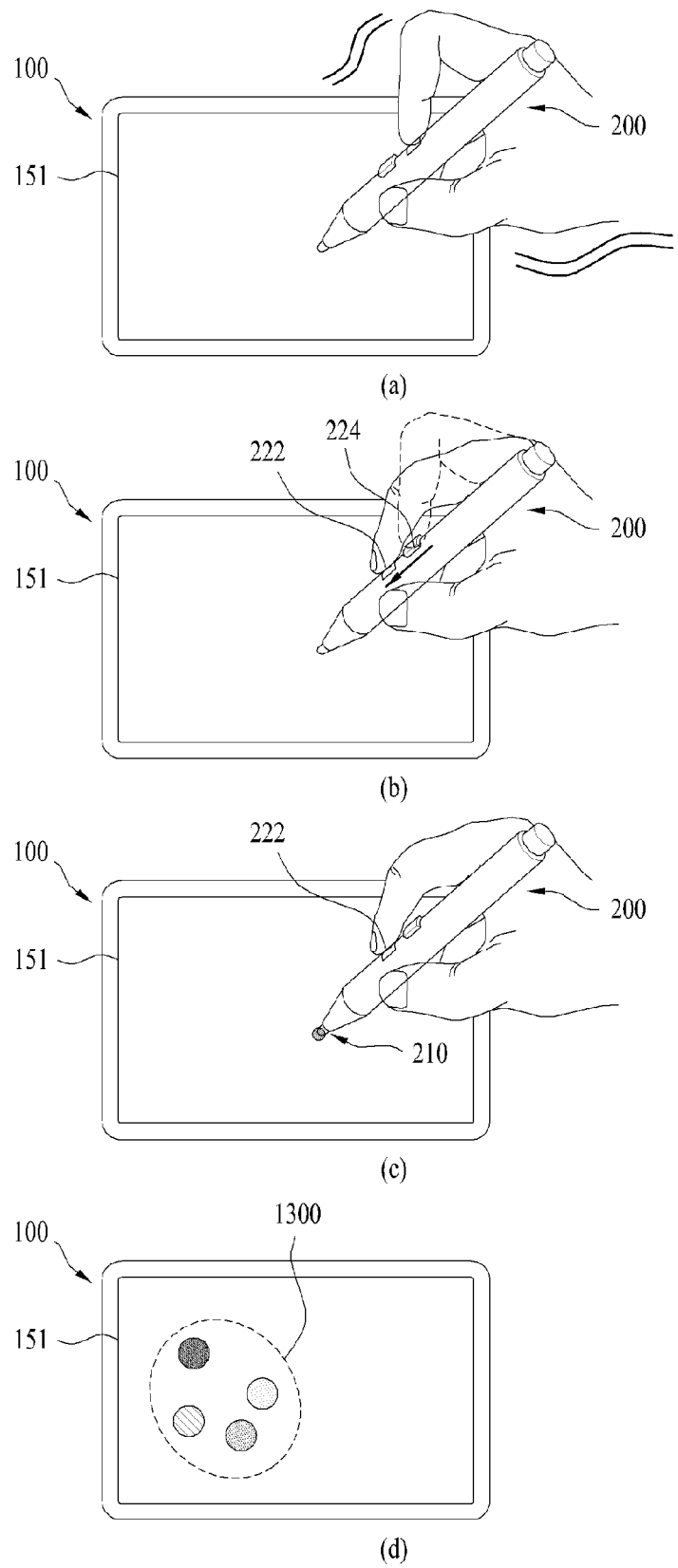
FIG. 13 is a diagram for one example of a process for pasting an object copied to a clipboard by detecting an inclination variation of a stylus pen in a mobile terminal according to one embodiment of the present invention.

FIG. 13 is a diagram for one example of a process for pasting an object copied to a clipboard by detecting an inclination variation of the stylus pen 200 in the mobile terminal 100 according to one embodiment of the present invention.

Referring to FIG. 13 (a), if the stylus pen 200 sways from side to side or inclines, the inclination detecting sensor of the stylus pen 200 detects a changed inclination of the stylus pen 200 and is then able to transmit a signal corresponding to the detected inclination to the mobile terminal 100.

The controller 180 can determine whether the inclination of the stylus pen 200 changes plural times at least in a prescribed time using the inclination corresponding signal. And, the controller 180 can determine whether the inclination of the stylus pen 200 changed over a prescribed inclination using the inclination corresponding signal.

Referring to FIG. 13 (b), if a user sequentially presses the second button 224 and the first button 222 of the stylus pen 200, the mobile terminal 100 can receive a second signal and a first signal sequentially.

After the inclination of the stylus pen 200 has been determined as changed plural times in the prescribed time from the inclination detected signals and the second signal and the first signal have been sequentially received, referring to FIG. 13 (c), if the touchscreen 151 is touched, the controller 180 can paste all objects copied to the clipboard.

Alternatively, after the signal of detecting the inclination of the stylus pen 200 changed over a prescribed inclination has been received and the second signal and the first signal have been sequentially received, if the touchscreen 151 is touched, the controller 180 can paste all objects copied to the clipboard.

In doing so, referring to FIG. 13 (*d*), the controller 180 can control each of the objects to be pasted on the corresponding point in a manner of being related to location information on copying the corresponding object. For instance, the controller 180 determines information of coordinates at which each of the objects is displayed on the touchscreen 151 on being copied and is then able to paste the object on the corresponding point of the touchscreen 151 in accordance with the coordinates information.

After the signal of detecting the inclination of the stylus pen 200 changed over a prescribed inclination has been received or the inclination of the stylus pen 200 has been determined as changed plural times in the prescribed time from the inclination detected signals, if the touchscreen 151 is touched, the controller 180 can paste the object copied to the clipboard on the touched point of the touchscreen 151.

In the following description, a method of copying an object displayed on the touchscreen 151 or pasting the object copied to the clipboard on the touchscreen 151 by manipulations of the first button 222 and the second button 224 of the stylus pen 200 is explained in detail with reference to FIG. 14.

Figure 14:
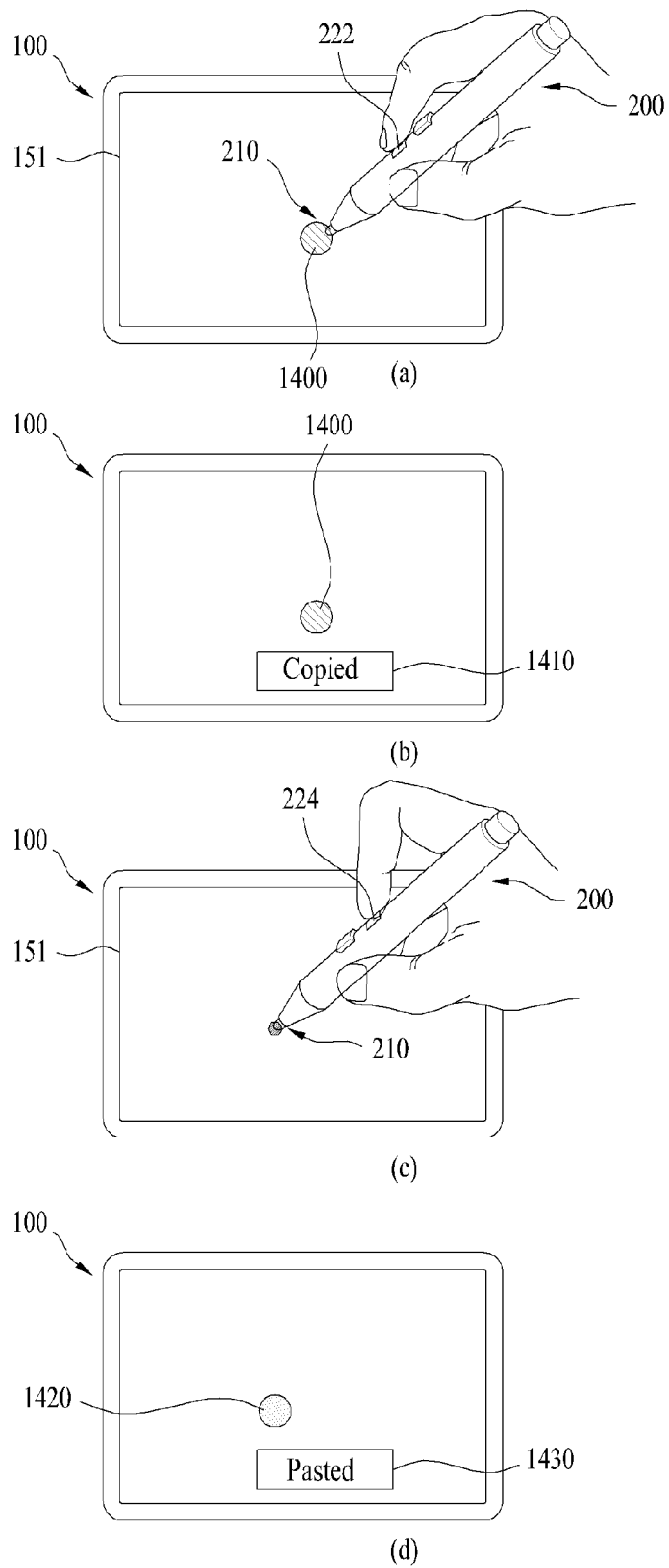
FIG. 14 is a diagram for one example of a process for copying or pasting a displayed object in response to a button manipulation of a pen in a mobile terminal according to one embodiment of the present invention.

FIG. 14 is a diagram for one example of a process for copying or pasting a displayed object in response to a manipulation of the button 220 of a pen in the mobile terminal 100 according to one embodiment of the present invention.

Referring to FIG. 14 (*a*), while an object displayed on the touchscreen 151 is touched, if the first button 222 is pressed, the short range communication unit 114 receives a first signal from the stylus pen 200 and the controller 180 can determine the object displayed at the touched point on the touchscreen 151.

If so, the controller 180 can copy the object, which is determined as displayed at the touched point, to a clipboard.

If the copy of the object is complete, referring to FIG. 14 (*b*), the controller 180 can display an indication text 1400 indicating that the copy is complete.

Subsequently, referring to FIG. 14 (*c*), while a prescribed point of the touchscreen 151 is touched, if the second button 224 is pressed, the short range communication unit 114 receives a second signal from the stylus pen 200 and the controller 180 can recognize the touch input to the prescribed point of the touchscreen 151.

If the second signal is received from the stylus pen 200, the controller 180 can paste the object copied to the clipboard on the prescribed point of the touchscreen 151, at which the touch input is recognized.

If the object pasting is complete, referring to FIG. 14 (*d*), the controller 180 can display an indication text 1410 indicating that the pasting is complete.

In the following description, a method of activating a prescribed function of the mobile terminal 100 through a manipulation of the button 220 of the stylus pen 200 is explained in detail with reference to FIG. 15.

FIG. 15 is a diagram for one example of a process for activating a prescribed function through a manipulation of the button 220 of the stylus pen 200 in the mobile terminal 100 according to one embodiment of the present invention.

Referring to FIG. 15 (*a*), if an input of pressing the first button 222 of the stylus pen 222 is received, the stylus pen 200 can transmit a first signal to the mobile terminal 100.

If the first signal is received, the controller 180 can perform a function corresponding to the first signal. For instance, referring to FIG. 15 (*b*), the controller 180 can activate and display a memo application program as the function corresponding to the first signal.

Moreover, if the second button 224 of the stylus pen 200 is pressed, the controller 180 can perform one of an operation of ending a currently active application program, an operation of cancelling the currently active application program, an operation of returning to a previous state and the like.

In the following description, a method of performing a prescribed function of the mobile terminal in response to a wind detected by the wind detecting sensor 231 of the stylus pen 200.

FIG. 16 is a diagram for one example of a process for performing a prescribed function in response to a wind detected by the stylus pen 200 in the mobile terminal 100 according to one embodiment of the present invention.

Referring to FIG. 16 (*a*), while an object 1610 displayed on the touchscreen 151 is touched, if a wind is detected by the wind detecting sensor 231 provided to the other end of the stylus pen 200, the short range communication unit 114 receives a wind detected signal from the stylus pen 200 and the controller 180 is then able to determine the object 1610 displayed at a touched point on the touchscreen 151.

In this case, the wind detected signal can include information on a direction and/or speed of the wind detected by the wind detecting sensor 231.

If so, the controller 180 can copy the object 1610, which is determined as displayed at the touched point in accordance with the wind detected signal, to a clipboard.

For instance, if a user inhales a wind from the stylus pen 200 while touching an object 1610 to copy, the wind detecting sensor 231 determines a direction of the inhaled wind and is then able to transmit a first wind detected signal to the mobile terminal. Subsequently, when the first wind detected signal is received, the controller 180 can copy the touch-maintained object 1610 to the clipboard.

In order to paste the object 1610 copied to the clipboard, if the user exhales a wind toward the stylus pen 200 while touching a prescribed point of the touchscreen 151, the wind detecting sensor 231 determines a direction of the exhaled wind and is then able to transmit a second wind detected signal including information on the determined direction of the wind to the mobile terminal 100. Subsequently, when the second wind detected signal is received, the controller 180 can paste the object 1610 copied to the clipboard on the prescribed point at which the touch is maintained.

If the copy of the object 1610 is complete, referring to FIG. 16 (*b*), the controller 180 can display an indication text 1620 indicating that the copy is complete.

Referring to FIG. 16 (*c*), while the first button 222 is pressed, if a wind is detected by the wind detecting sensor 231 provided to the other end of the stylus pen 200, the short range communication unit 114 can receive a first signal and a wind detected signal from the stylus pen 200.

While the first signal is received, if a touch with the stylus pen 200 is inputted to the touchscreen 151, the controller 180 can recognize the touch input to a prescribed point of the touchscreen 151. If so, the controller 180 can paste an object copied to the clipboard from the stylus pen 200 on the prescribed point of the touchscreen 151.

For instance, in order to paste an object copied to the clipboard, if a user exhales a wind toward the stylus pen 200 while pressing the first button 222, the wind detecting sensor 231 determines a direction of the exhaled wind and is then able to transmit a second wind detected signal including information on the direction of the wind and a first signal attributed to pressing the first button 222 to the mobile terminal 100. If so, when the first signal is received, the controller 180 can paste the object copied to the clipboard on the touched prescribed point.

For another instance, if a user inhales a wind from the stylus pen 200 while pressing the first button 222, the wind detecting sensor 231 determines a direction of the inhaled wind and is then able to transmit a first wind detected signal including information on the direction of the wind and a first signal attributed to pressing the first button 222 to the mobile terminal 100. If so, when the first signal is received, the controller 180 can copy the touched object to the clipboard.

If the pasting of the object 1610 is complete, referring to FIG. 16 (d), the controller 180 can display an indication text 1640 indicating that the pasting is complete.

Figure 17:
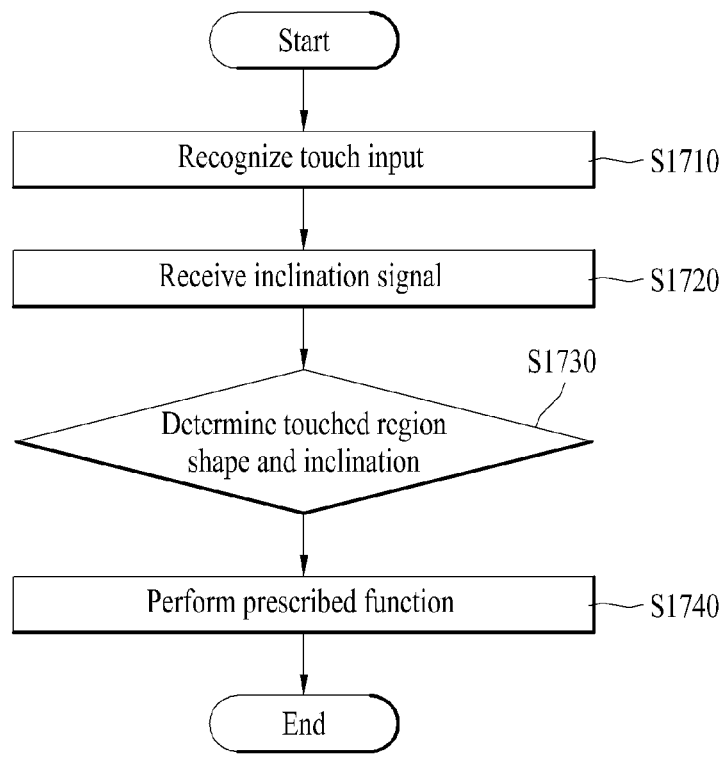
FIG. 17 is a flowchart for a method of controlling a mobile terminal according to one embodiment of the present invention.

FIG. 17 is a flowchart for a method of controlling a mobile terminal according to one embodiment of the present invention.

Referring to FIG. 17, the controller 180 recognizes an input of a touch with the stylus pen 200 [S1710]. In particular, the controller 180 can recognize the input of the touch with the body 230 of the stylus pen 200 recognized through the touchscreen 151.

For instance, if the body 230 of the stylus pen 200 has a cylindrical configuration, the body 230 of the stylus pen 200 may be touched in form of a line to the touchscreen 151.

The short range communication unit 114 receives an inclination signal of the stylus pen 200 from the stylus pen 200 [S1720]. In this case, the inclination signal can include a value of the inclination of the stylus pen 200, which is detected by the inclination detecting sensor.

If so, the controller 180 determines a shape of a touched region of the touchscreen 151 and the inclination of the stylus pen 200 based on the inclination signal [S1730].

In particular, first of all, the controller 180 can determine the shape of the touched region of the touchscreen 151. For instance, if a prescribed point of the touchscreen 151 is touched with the pen tip 210 of the stylus pen 200, the controller 180 can determine the shape of the touched region as a point. For another instance, if the touchscreen 151 is touched with the body 230 of the stylus pen 200, the controller 180 can determine the shape of the touched region as a line.

The controller 180 can determine an inclination of the touched region determined as the line. Moreover, based on the inclination of the stylus pen 200 detected by the inclination detecting sensor, the controller 180 may determine whether the inclination of the stylus pen 200 belongs to a prescribed inclination range.

Hence, the controller 180 compares the inclination of the stylus pen 200 by the inclination detecting sensor to the inclination of the touched region determined as the like and is then able to determine whether the touch input corresponds to the touch with the body 230 of the stylus pen 200.

For instance, the controller 180 can determine an inclination of the stylus pen 200 in a direction of an area of the touchscreen 151. If the stylus pen 200 inclines on the touchscreen 151, the controller 180 can determine an inclination of the stylus pen 200 in the same plane of the touchscreen 151.

The controller 180 performs a prescribed function in accordance with the determined shape of the touched region and the determined inclination [S1740]. For instance, if the shape of the touched region of the touchscreen 151 is determined as a line inclining in a prescribed inclination range, the controller 180 can control a plurality of objects for performing prescribed functions to be displayed to correspond to the touched region.

When a screen displayed on the touchscreen 151 is aligned in an a-axis direction, if an input of a touch with the stylus pen 200 is determined as an inclination from a b-axis within 5 degrees, the controller 180 can display a plurality of objects.

In the following description, a method of performing a prescribed function of the mobile terminal 100 using the stylus pen 200 is explained in detail with reference to FIGS. 18 to 20.

Figure 18:
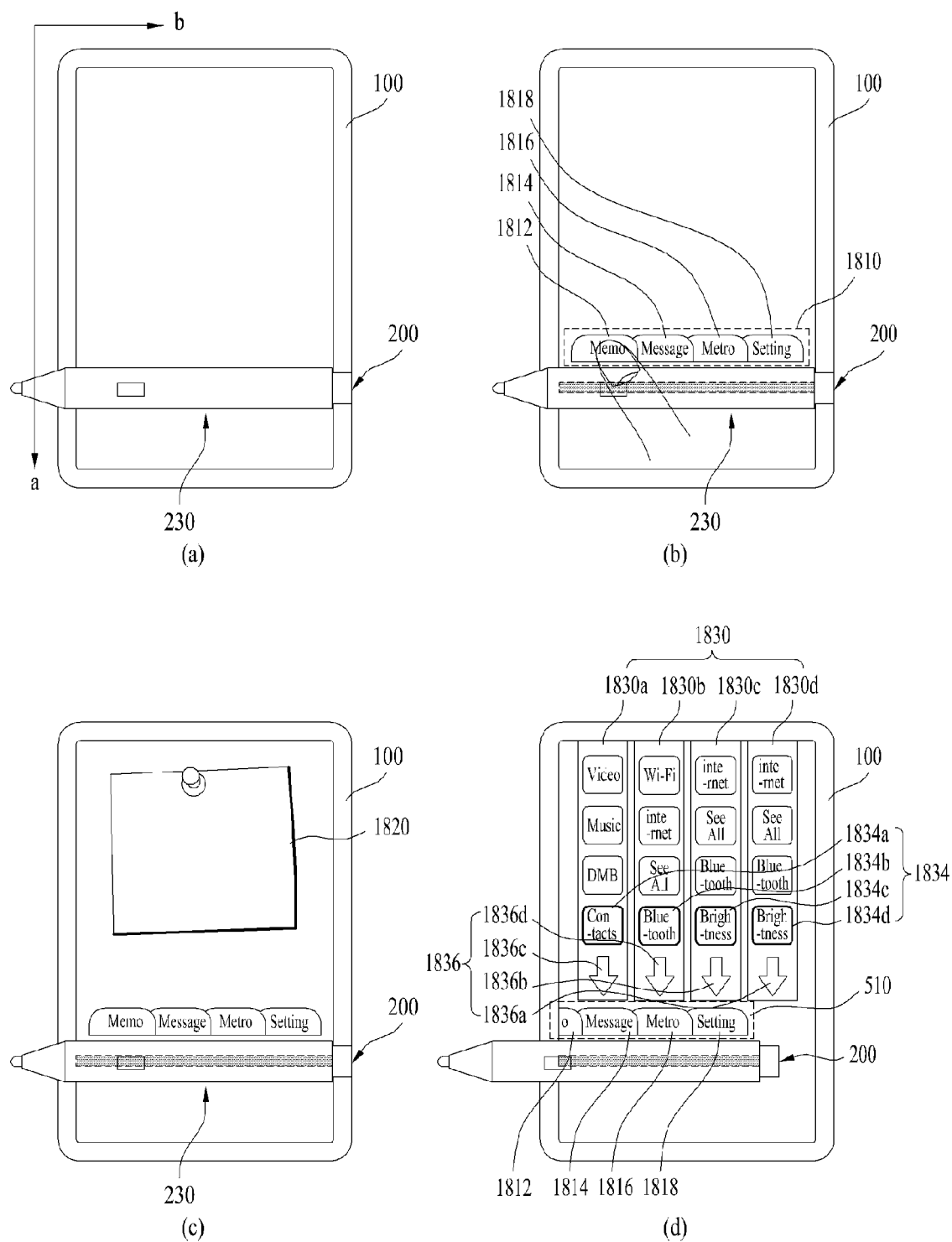
FIG. 18 is a diagram for one example of a process for performing a prescribed function in response to a touch input using a stylus pen in a mobile terminal according to one embodiment of the present invention.

FIG. 18 is a diagram for one example of a process for performing a prescribed function in response to a touch input using the stylus pen 200 in the mobile terminal 100 according to one embodiment of the present invention.

Referring to FIG. 18 (a), the body 230 of the stylus pen 200 may be touched as a prescribed line to the touchscreen 151.

When a basic screen is displayed on the touchscreen 151, if an input of a touch with the stylus pen 200 is recognized, referring to FIG. 18 (b), the controller 180 can control a plurality of icons 1812, 1814, 1816 and 1818 to be displayed above the touched region on the touchscreen 151. In this case, a region for displaying a plurality of the icons 1812, 1814, 1816 and 1818 thereon shall be assumed as an index region 1810.

For instance, the controller 180 can display an object 1812 for activating a memo application, an object 1814 for activating a message application program, an object 1816 for activating a subway application program 1816 and an object 1818 for setting objects to be displayed on the index region 1810.

In doing so, each of the objects may be represented as an icon, a text, an image, or a combination thereof.

For another instance, the controller 180 can display an emergency call object, an unlock object, a camera activating object, an object for displaying contact information for a user of the mobile terminal 100 and the like on the index region 1810 displayed when the mobile terminal 100 is in a locked state.

For further instance, the controller 180 can display a new memo add object, a memo file open object and a current memo save object on the index region 1810 displayed when a memo contact application program is running.

In particular, if an input of a touch with the stylus pen 200 is recognized and the shape of the touched region of the touchscreen 151 is determined as a line inclining in a prescribed inclination range, the controller 180 can display the index region 1810 in which a different combination of objects is set depending on a screen currently displayed on the touchscreen 151 or a currently running application program.

Each of the objects can be displayed as an object in the same shape within the index region 1810. In accordance with a frequency of selecting each of the objects displayed on the index region 1810, the objects can be displayed in different order on the index region 1810.

Referring to FIG. 18 (c), if a touch input to the object 1812 for activating the memo application is recognized, the controller 180 can activate the memo application and display an active screen.

If a touch input to the object 1818 for setting objects to display on the index region 1810 is recognized, the controller 180 can display a list of application programs displayable on the index region 1810. In doing so, the list of the application programs can be displayed as a list of objects respectively corresponding to the application programs.

For instance, if a user touches a prescribed one of the application programs in the displayed list, the controller 180 can additionally display the objet corresponding to the selected application program on the index region 1810.

If a prescribed one of the selected application programs is touched and then dragged to an existing object displayed on the index region 1810, the controller 180 can control the object corresponding to the touched application program to be displayed in a manner of replacing the existing object displayed on the index region 1810.

If an existing object displayed on the index region 1810 is touched and then dragged outside the index region 1810, the controller 180 can delete the touched object from the index region 1810.

For another instance, referring to FIG. 18 (*d*), the controller 180 can display a list of application programs on each of a plurality of arrays 1830.

An object select region 1834 for locating an application program to be displayed on the index region 1810 and an object 1836 for inserting an object corresponding to the application program located at the object select region 1834 in the index region 1810 can be displayed on the bottom of each of the arrays 1830.

The application program displayed on each of the arrays 1830 is movable up and down in the corresponding array 1830 and can be located at the object select region 1834 through an up-and-down movement.

After the object displayed on the index region 1810 and the corresponding array 1830 have been located on the same line in a manner of moving the stylus pen 200, if the object inserting object 1836 is touched, the controller 180 can control the object of the application program, which is located in the object select region 1834 of the array 1830 located on the same line, to be displayed in a manner of replacing the object displayed on the index region 1810.

For instance, referring to FIG. 18 (*d*), a contact object is displayed on an object select region 1834*a* of a first array 1830*a*, a Bluetooth activating object is displayed on an object select region 1834*b* of a second array 1830*b*, and a brightness setting object is displayed on an object select region 1834*c* of a third array 1830*c*.

In doing so, if a user locates the stylus pen 200 below the objects 1836*a*, 1836*b* and 1836*c* to insert in the index region 1810 and then selects the corresponding objects, the controller 180 can change the object 1814 for activating the message application program, the object 1816 for activating the subway application program 1816 and the object 1818 for setting the object to be displayed on the index region 1810 into the contact object, the Bluetooth activating object and the brightness setting object, respectively.

FIG. 19 is a diagram for one example of a process for performing a prescribed function in response to a touch input using the stylus pen 200 in the mobile terminal 100 according to another embodiment of the present invention.

Referring to FIG. 19 (*a*), the controller 180 can display an object 1900 on the touchscreen 151. In this case, assume that the object 1900 is attributed to a picture drawing input through the stylus pen 200.

The body 230 of the stylus pen 200 may be touched in the shape of a line to a left side of the touchscreen 151. The controller 180 can determine an inclination of a touched region determined as the line. Through an inclination of the stylus pen 200 detected by the inclination detecting sensor, the controller 180 can determine whether the inclination of the stylus pen 200 belongs to a prescribed inclination range.

Hence, the controller 180 compares the inclination of the stylus pen 200 by the inclination detecting sensor to the inclination of the touched region determined as the line and is then able to determine whether the touch input is the touch with the body 230 of the stylus pen 200.

Referring to FIG. 19 (*b*), if the touch input of the stylus pen 200 is determined as having an inclination from an axis-a within 5 degrees and the stylus pen 200 is dragged to a right side of the touchscreen 151 by maintaining the inclination, the controller 180 can delete the object displayed on a trace of the touch with the stylus pen 200.

Referring to FIG. 19 (*c*), when an object is displayed on the touchscreen 151 and an inclination of a touched region is changed while touched with the stylus pen 200, the controller 180 can change a visual effect of the object 1900 displayed on a trace of the touch with the stylus pen 200.

For instance, referring to FIG. 19 (*a*), if the stylus pen 200 is inclined from the a-axis at an inclination of c while the body 230 of the stylus pen 200 touches the touchscreen 151, the controller 180 can lower the brightness of the object 1900 displayed on the trace of the touch with the stylus pen 200 into a prescribed level 1910*b* from a previous level 1910*a*.

Thereafter, while the body 230 of the stylus pen 200 touches the touchscreen 151, if the stylus pen 200 inclining at the inclination of c from the a-axis returns to a previous inclination, the controller 180 can control the brightness of the object 1900, which is displayed on the trace of the touch with the stylus pen 200, to return to the previous level 1910*a* from the prescribed level 1910*b*.

In particular, while the touchscreen 151 is touched with the body 230 of the stylus pen 200, the controller 180 can perform a prescribed function in response to an inclination change of the touched region.

Figure 20:
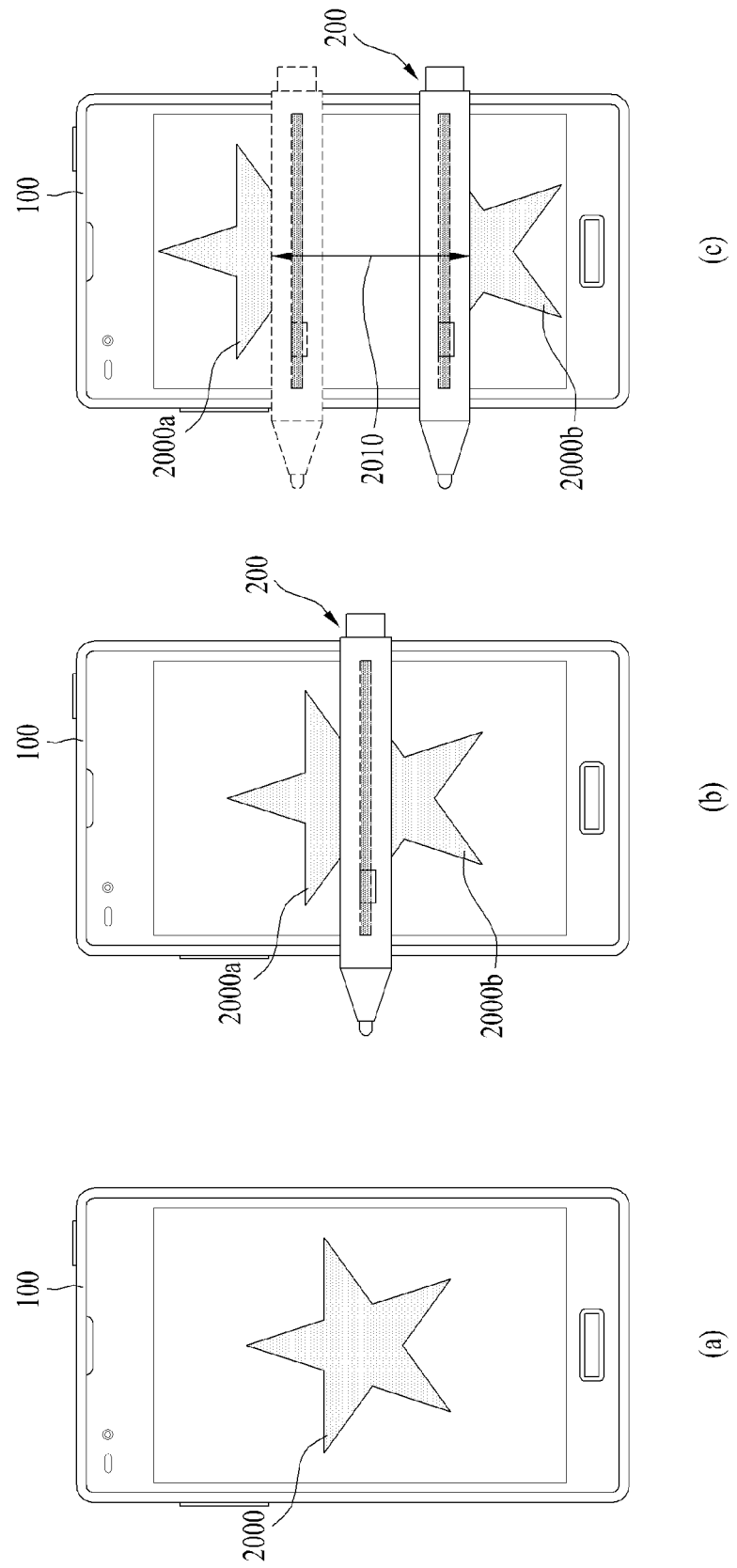
FIG. 20 is a diagram for one example of a process for performing a prescribed function in response to a touch input using a stylus pen in a mobile terminal according to further embodiment of the present invention.

FIG. 20 is a diagram for one example of a process for performing a prescribed function in response to a touch input using the stylus pen 200 in the mobile terminal 100 according to further embodiment of the present invention.

Referring to FIG. 20 (*a*), the controller 180 can display an object 2000 on the touchscreen 151. In this case, assume that the object 2000 is attributed to a picture drawing input through the stylus pen 200.

Referring to FIG. 20 (*b*), the body 230 of the stylus pen 200 can touch the touchscreen 151 in the shape of a line. If so, the controller 180 can determine a shape of the touched region of the touchscreen 151 as a line.

The controller 180 can determine an inclination of the touched region determined as the line. Moreover, through an inclination of the stylus pen 200 detected by the inclination detecting sensor, the controller 180 may determine whether the inclination of the stylus pen 200 belongs to a prescribed inclination range.

Hence, the controller 180 compares the inclination of the stylus pen 200 detected by the inclination detecting sensor and the inclination of the touched region determined as the line and is then able to determine whether the touch input includes the touch with the body 230 of the stylus pen 200.

In doing so, if the region touched with the stylus pen 200 is determined as the line, the controller 180 can divide the object 2000 displayed on a region on which the line is located with reference to the line.

In particular, the controller 180 may divide the object 2000 in a manner that an inclination of a reference line for dividing the object 2000 is equal to the inclination of the region touched with the stylus pen 200.

The controller 180 may display the divided objects 2000*a* and 2000*b* in a manner of spacing the divided objects 2000*a* and 2000*b* apart from each other by a distance 2010 amounting to a width of the touched region.

For instance, referring to FIG. 20 (*c*), if the stylus pen 200 moves up and down while touched with the stylus pen 200, the controller 200 can control the divided two objects 2000*a* and 2000*b* to be displayed in a manner of being spaced apart from each other by the distance amounting to the up-an-down movement of the stylus pen 200.

In the following description, a method of changing a shape of an object displayed on the touchscreen 151 in response to a position of gripping (or holding) the stylus pen 200 is explained in detail with reference to FIG. 21.

First of all, if the controller 180 recognizes a trace of a touch with the stylus pen 200, the controller 180 can display an object corresponding to the touch trace. In particular, the controller 180 can display the touch trace in accordance with a drawing mode on recognizing the touch trace. In this case, the touch input by the stylus pen 200 may include a touch input by the pen tip 210 of the stylus pen 200.

For instance, in pen mode, the controller 180 can display a recognized touch trace as a trace drawn with a pen. For another instance, in brush mode, the controller 180 can display a recognized touch trace as a trace drawn with a brush. For further instance, in charcoal mode, the controller 180 can display a recognized touch trace as a trace drawn with a charcoal.

For another further instance, in pointer mode, the controller 180 can display a pointer on the touchscreen 151 in response to a recognized touch input.

Figure 21:
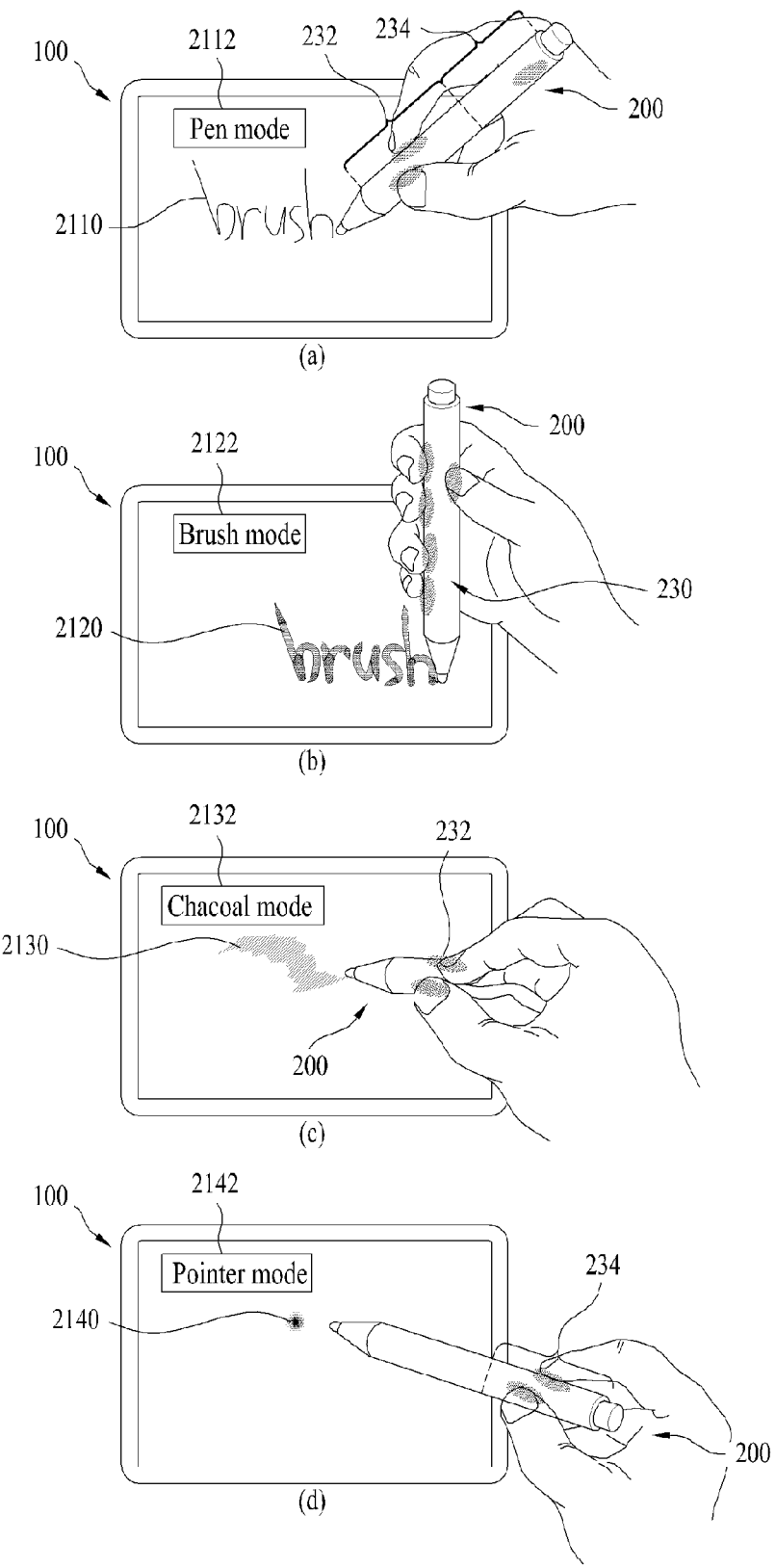
FIG. 21 is a diagram for one example of a process for changing a visual effect of a displayed object in response to a stylus pen gripped position in a mobile terminal according to one embodiment of the present invention.

FIG. 21 is a diagram for one example of a process for changing a visual effect of a displayed object in response to a position, at which the stylus pen 200 is gripped, in the mobile terminal 100 according to one embodiment of the present invention.

Referring to FIG. 21, a user is able to grip the body 230 of the stylus pen 200 with a hand in various gripping postures. If so, the grip sensor detects a position at which the stylus pen 200 is gripped. Hence, the controller 180 can change a visual effect of an object by an input of a touch with the stylus pen 200.

For instance, referring to FIG. 21 (*a*), if a first part 232 is held by a forefinger in a general pen gripping posture, a middle finger and a thumb and a second part is supported by a palm, the grip sensor can detect that a touch is inputted to 3 regions of the first part 232 and that a touch is inputted to a prescribed region of the second part 234.

If so, the controller 180 recognizes the touch inputs detected by the grip sensor and is then able to change a drawing mode into a pen mode. If the pen mode is entered, the controller 180 displays a trace of a touch with the stylus pen 200 as a trace 2110 drawn with a pen and is able to display an indicator 2112, which indicates that a current mode is the pen mode, on the touchscreen 151.

For another instance, referring to FIG. 21 (*b*), if a touch input to 5 regions of the body 230 of the stylus pen 200 is detected, the controller 180 recognizes the touch input detected by the grip sensor and is then able to change the drawing mode into the brush mode.

If the brush mode is entered, the controller 180 displays a trace of a touch with the stylus pen 200 as a trace 2120 drawn with a brush and is able to display an indicator 2122, which indicates that a current mode is the brush mode, on the touchscreen 151.

For another instance, referring to FIG. 21 (*c*), if a touch input to the first part 232 is detected only, the controller 180 recognizes the touch input detected by the grip sensor and is then able to change the drawing mode into a charcoal mode.

If the charcoal mode is entered, the controller 180 displays a trace of a touch with the stylus pen 200 as a trace 2120 drawn with a charcoal and is able to display an indicator 2132, which indicates that a current mode is the charcoal mode, on the touchscreen 151.

For another instance, referring to FIG. 21 (*d*), if a touch input to the second part 234 is detected only, the controller 180 recognizes the touch input detected by the grip sensor and is then able to change the drawing mode into a pointer mode.

If the pointer mode is entered, the controller 180 displays a point touched with the stylus pen 200 as a pointer 2140 and is able to display an indicator 2142, which indicates that a current mode is the pointer mode, on the touchscreen 151.

Therefore, the mobile terminal 100 can control an object, which is to be displayed on the touchscreen 151 in response to a touch input, to be represented differently depending on a posture of gripping the stylus pen 200.

In the following description, a method of changing a visual effect of an object displayed on the touchscreen 151 in response to an input of a touch with the pen tip 210 of the stylus pen 200 step by step depending on a time taken for the pen tip 210 to touch the touchscreen 151.

FIG. 22 is a diagram for one example of a process for changing a visual effect of a displayed object in response to a touch input depending on a stylus pen touched time in the mobile terminal according to one embodiment of the present invention.

Referring to FIG. 22, the controller 180 can display an object 2200*a* corresponding to a trace of a touch with the stylus pen 200 on the touchscreen 151.

If a time taken for the touch with the stylus pen 200 increases, the controller 180 can change a visual effect of the object 2200*a* corresponding to the trace of the touch.

For instance, referring to FIG. 22 (*b*), a thickness of a trace 2200*b* of the touch input displayed on the touchscreen 151 may increase depending on a time taken for the stylus pen 200 to touch the touchscreen. In order to display a trace of the stylus pen 200, the controller 180 can control the thickness of the trace 2200*a* to be set to 0.5 mm when the stylus pen 200 touches the touchscreen 151 initially.

If the time taken to display the trace of the touch to the touchscreen 151 with the stylus pen 200 corresponds to a first interval, the controller 180 can increase the thickness of the trace in a manner of setting the thickness of the trace 2200*b* to 1 mm.

Thereafter, if the time taken to display the trace of the touch to the touchscreen 151 with the stylus pen 200 corresponds to a second interval, the controller 180 can increase the thickness of the trace in a manner of setting the thickness of the trace to 2 mm. Thus, as the time taken to display the trace of the touch to the touchscreen 151 with the stylus pen 200 increases, the controller 180 can correspondingly increase the thickness of the trace gradually.

Yet, the time taken to display the trace of the touch to the touchscreen 151 with the stylus pen 200 and the correspondingly changing visual effect of the trace may be non-limited by the thickness change.

In the following description, a method of canceling a visual effect of the object 2200*b* in response to a touch input to a visual effect cancel object displayed on the touchscreen 151 is explained in detail.

Referring to FIG. 22 (*c*), the controller 180 can control an object 2210 for canceling a visual effect to be displayed on a prescribed region of the touchscreen 151. If the visual effect cancel object 2210 is touched with the stylus pen 200 or an input of dragging two points on the object 2210 is recognized, the controller 180 can cancel the visual effect.

The controller 180 can increase a visual effect cancellation level depending on a count or time for touching or dragging the visual effect cancel object 2210.

For instance, if a thickness of a trace of a touch to the touchscreen 151 with the stylus pen 200 is 2 mm, the controller 180 can decrease the thickness of the trace into 1 mmm by applying an input of touching and dragging the visual effect cancel object once or 0.5 mm by applying an input of touching and dragging the visual effect cancel object twice.

If the stylus pen 200 further includes the acceleration sensor, referring to FIG. 22 (*d*), the acceleration sensor can detect an acceleration and a rotational movement direction when the stylus pen 200 rotates. If so, a signal including the detected acceleration and rotational movement direction can be transmitted to the short range communication unit 114 of the mobile terminal 100.

If so, the controller 180 recognizes a gesture of rotating the stylus pen 200 and is then able to cancel the visual effect of the object 2200*b* step by step depending on a rotation count or angle of the stylus pen 200.

In the following description, a method of changing a visual effect of an object through an input of pressing the button 220 provided to one side of the stylus pen 200 is explained in detail with reference to FIG. 23.

FIG. 23 is a diagram for one example of a process for receiving a button press signal from the stylus pen 200 and performing a prescribed function in response to the button press signal in the mobile terminal 100 according to one embodiment of the present invention.

Referring to FIG. 23, the controller 180 can display a text 1000 on the touchscreen 151.

In doing so, a trace attributed to a touch input can be displayed on the touchscreen 151 in a manner of being highlighted with a highlighter. And, the controller 180 can control an indicator 2310, which indicates that a current mode is a highlighter mode, to be displayed on the touchscreen 151.

A user can press the button 220 of the stylus pen 200 while touching a text part, which is to be highlighted, with the pen tip 210 of the stylus pen 200. If so, the short range communication unit 114 receives a button press signal of the stylus pen 200.

If so, referring to FIG. 23 (*b*), the controller 180 can control a whole row 1002 of the text, which is touched when the button press signal is received, to be displayed in a manner of being highlighted.

Referring to FIG. 23 (*c*), the controller 180 can display an active screen of a memo application program. And, a text 2310 can be displayed on the active screen of the memo application program.

In doing so, a trace attributed to a touch input can be displayed with a pen on the touchscreen 151. And, the controller 180 can control an indicator 2320, which indicates that a current mode is a pen mode, to be displayed on the touchscreen 151.

While the pen tip 210 of the stylus pen 200 touches the active screen of the memo application program, a user can press the button 220 of the stylus pen 200. If so, the short range communication unit 114 receives a signal of pressing the button 220 of the stylus pen 200.

If so, referring to FIG. 23 (*d*), if the button press signal is received, the controller 180 can create a new memo 2330.

In particular, it is able to set a different function, which is to be performed when a button press signal is received, depending on a displayed screen activated in the mobile terminal 100. Moreover, it is able to set a different function, which is to be performed when a button press signal is received, depending on a drawing mode.

In particular, despite the same drawing mode, a function, which is to be performed by the controller 180 when a button press signal is received, can be changed depending on a currently activated and displayed application program.

Moreover, despite that the same application program is active, a function, which is to be performed by the controller 180 when a button press signal is received, can be changed depending on a drawing mode.

Meanwhile, a camera (not shown in the drawing) is mounted on the stylus pen 200. In this case, the camera recognizes a light that transmits a lens of the camera and then converts the recognized light to digital data. The camera may be built in one body of the pen tip 210 provided to one end of the stylus pen 200. Alternatively, the camera may be located at the other end that opposes the pen tip 210.

If the button 220 of the stylus pen 200 is pressed, the camera recognizes the light that transmits the lens at that moment. The button 220 may be provided to the lateral side of the stylus pen 200, as shown I FIG. 3. If the camera is built in one body of the pen tip 210, the button 220 is located at the other end of the stylus pen 200. Hence, it is able to press the button 220 in a manner of pressing the other end.

The stylus pen 200 can include a wireless communication module configured to transmit a signal to the mobile terminal 100. In particular, the wireless communication module transmits an image taken through the camera to the mobile terminal 100. A transmitted color information can be received by the wireless communication unit 110 of the mobile terminal 100. The transmission of the image taken through the camera of the stylus pen 200 to the mobile terminal 100 is normally performed in the course of using the mobile terminal 100. Hence, it is able to use the short range communication module 114 because a spaced distance between the mobile terminal 100 and the stylus pen 200 is not considerably long.

In the following description, a method of photographing an image with the stylus pen 200 and using the photographed image in the touchscreen 151 of the mobile terminal 100 is explained in detail with reference to FIG. 24 and FIG. 25.

FIG. 24 and FIG. 25 are diagrams of screens of the touchscreen 151 for outputting and using an image photographed with of the stylus pen 200 according to one embodiment of the present invention.

Referring to FIG. 24 (*a*), a user enables the camera of the stylus pen 200 to approach a thing 2410 (e.g., a textile fabrics in the drawing) located around and is then able to press the button 220. In the examples shown in the drawing, the camera is located at the pen tip 210 of the stylus pen 200. Hence, when the pen tip 210 of the stylus pen 200 approaches the textile fabrics 2410, the textile fabrics 2410 is photographed. Subsequently, a photographed image of the textile fabrics can be converted to digital information.

The photographed image is transmitted to the mobile terminal 100 through the wireless communication module of the stylus pen 200 and the wireless communication unit 110 of the mobile terminal 100. And, the photographed image can be then outputted through a popup window displayed on the touchscreen 151.

If the textile fabrics 2410 is photographed in the course of running a drawing function or a memo function, in order to insert the photographed image 2406 in a closed curve region 2402 displayed on the touchscreen 151, an image palette 2404 can be provided. The photographed image 2406 can be added to the palette 2404.

An operation of addition to the palette 2404 may be set to be automatically performed after prescribed duration. Alternatively, the operation of addition to the palette 2404 may be performed in a manner that the user shifts a color displayed popup window to the palette 2404.

Referring to FIG. 24 (*b*), the controller 180 can control the photographed image 2406 added to the palette 2404 to be inserted as a pattern image 2408 into the closed curve region 2402 displayed on the touchscreen 151. Particularly, since patterns of things around are directly usable on a screen of the touchscreen 151 in drawing a picture, it is able to utilize various pattern images.

Referring to FIG. 25 (a), when a user draws a pattern image 2500 on the touchscreen 151, the pattern image displayed on the touchscreen 151 is photographed through the camera. The controller 180 is then able to add the photographed pattern image to a palette 2502. Alternatively, a pattern image 2504 can be added to the palette 2502 through an input of touching the pattern image 2500 displayed on the touchscreen 151.

If so, referring to FIG. 25 (b), the added pattern image 2504 shown in FIG. 25 (a) can be inserted in a closed curve region 2510 displayed by the user on the touchscreen 151.

In the following description, a method of turning off a backlight unit of the touchscreen 151 or lowering the intensity of radiation in response to a location of a contact between the stylus pen 200 and the mobile terminal 100 is explained in detail with reference to FIG. 26.

FIG. 26 is a diagram for one example of a process for disabling a backlight unit of the touchscreen 151 using the stylus pen 200 in the mobile terminal 100 according to one embodiment of the present invention.

Referring to FIG. 26 (a), a backlight unit of the touchscreen 151 can be disabled if the body 230 of the stylus pen 200 comes in contact with the touchscreen 151.

For instance, while a user is using the mobile terminal 100 with the stylus pen 200, if the user puts the stylus pen 200 on the touchscreen 151, the controller 180 recognizes a touch input of the stylus pen 200 and is then able to disable the backlight unit. In doing so, as a time elapses since the user put the stylus pen 200 on the touchscreen 151, the controller 180 can lower the radiation intensity of the backlight unit step by step. If a prescribed time expires, the controller 180 can disable the backlight unit.

Subsequently, if the stylus pen 200 is spaced apart from the touchscreen 151, the controller 180 can reactivate the backlight unit.

Referring to FIG. 26 (b), if a magnetic body and a sensor for detecting magnetism are provided to one side of the mobile terminal 100 and another magnetic body is further provided to the stylus pen 200, the stylus pen 200 may be restricted by a magnetic force generated from one side of the mobile terminal 100. And, the mobile terminal 100 can disable or deactivate the backlight unit by detecting the magnetism generated from the magnetic body of the stylus pen 200.

Subsequently, as the stylus pen 200 is spaced apart from the mobile terminal 100, if the magnetism is not further detected, the controller 180 can reactivate the backlight unit.

Moreover, as soon as the backlight unit is disabled, the controller 180 can control the mobile terminal 100 to enter a locked mode.

Meanwhile, the pen tip 210 of the stylus pen 200 may include a photoelectric device. The controller 180 can control the photoelectric device to emit light in a color of an object displayed to correspond to a trace of a touch input. In this case, the photoelectric device may be configured in one body of the pen tip 210.

For instance, in case of representing a trace of a touch input applied by a user in red, the controller 180 can transmit a signal for enabling the photoelectric device of the stylus pen 200 to emit in red to the stylus pen 200 through the short range communication unit 114. If so, the photoelectric device provided to the pen tip 210 of the stylus pen 200 emits light in red so as to emit light in the same color of the trace of the touch input.

For another instance, if a thickness of the trace of the touch input applied by the user is 0.5 mm, the controller 180 controls the photoelectric device to emit light in blue. For another instance, if a thickness of the trace of the touch input applied by the user is 1 mm, the controller 180 controls the photoelectric device to emit light in green.

In particular, the controller 180 can control the photoelectric device to emit light in different color in accordance with a drawing mode of the stylus pen 200. Therefore, the mobile terminal 100 enables the user to recognize a current drawing mode with ease.

Accordingly, embodiments of the present invention provide various effects and/or features.

According to at least one of embodiments of the present invention, a prescribed function can be simply performed through a stylus button manipulation. Therefore, the present invention enhances convenience of a touch input to the mobile terminal using a stylus pen and extends a utilization range to enable various representations.

It will be appreciated by those skilled in the art that the present invention can be specified into other form(s) without departing from the spirit or scope of the inventions.

The above-described methods can be implemented in a program recorded medium as computer-readable codes. The computer-readable media may include all kinds of recording devices in which data readable by a computer system are stored. The computer-readable media may include ROM, RAM, CD-ROM, magnetic tapes, floppy discs, optical data storage devices, and the like for example and also include carrier-wave type implementations (e.g., transmission via Internet). Further, the computer may include the controller 180 of the terminal.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
   a short range communication unit configured to receive a plurality of different signals from a stylus pen, wherein the stylus pen includes a first button and a second button;
   a touchscreen to display a first object and a second object; and
   a controller performing a prescribed function by combining a type of a signal received from the stylus pen, from among a plurality of the different signals, and a touch pattern of the stylus pen recognized on the touchscreen,
   wherein when the first button and the second button are sequentially manipulated after the stylus pen touches the first object, the controller copies the touched first object to a clipboard, and
   wherein when the stylus pen touches the second object while the second button is being manipulated, the controller further copies the touched second object.

2. The mobile terminal of claim 1, wherein when the first button is sequentially manipulated after the second button is manipulated over a prescribed time while a prescribed region of the touchscreen is touched with the stylus pen, the controller pastes the first object and the second object, and
   wherein the pasted location of the first object and the second object are original location thereof, respectively.

3. The mobile terminal of claim 1 wherein when the first button is manipulated, the stylus pen transmits a first signal, and
   wherein when the second button is manipulated, the stylus pen transmits a second signal.

4. The mobile terminal of claim 3, wherein when a prescribed region of the touchscreen is touched with the stylus pen over a prescribed time, the controller displays at least one thumbnail corresponding to at least one object copied to the clipboard on the prescribed region.

5. The mobile terminal of claim 4, wherein when at least one of the displayed at least one thumbnail is touched with the stylus pen, the controller pastes the object corresponding to the touched thumbnail on the prescribed region.

6. The mobile terminal of claim 1, wherein while the prescribed region of the touchscreen is touched with the stylus pen, when the second signal is received over a prescribed time and the first signal is then received, the controller pastes a most formerly copied object among a plurality of objects copied to the clipboard on the prescribed region.

7. The mobile terminal of claim 3, wherein when the controller copies the touched object to the clipboard, the controller saves a location information of the touched object on the touchscreen.

8. The mobile terminal of claim 7, wherein the controller pastes the object copied to the clipboard on the touchscreen in accordance with the saved location information.

9. The mobile terminal of claim 3, wherein the stylus pen further includes an inclination detecting sensor, wherein when an inclination variation of the stylus pen is detected, the stylus pen transmits a signal corresponding to a detected inclination to the short range communication unit, and wherein when the inclination of the stylus pen is determined as equal to or greater than a prescribed inclination based on the received inclination corresponding signal and a prescribed region of the touchscreen is touched, the controller pastes at least one of the objects copied to the clipboard on the prescribed region.

10. The mobile terminal of claim 9, wherein when the inclination of the stylus pen is determined as changing plural times at least within a prescribed time based on the received inclination corresponding signal and the prescribed region of the touchscreen is touched with the stylus pen, the controller pastes at least one of the objects copied to the clipboard on the prescribed region entirely.

11. The mobile terminal of claim 3, wherein when the first signal and the second signal are sequentially received, the controller copies at least one object displayed in a simple closed curve trace touched with the stylus pen to the clipboard.

12. The mobile terminal of claim 11, wherein the controller controls the at least one object copied to the clipboard to be pasted on the touchscreen in a manner of being displayed within the simple closed curve trace.

13. The mobile terminal of claim 1, wherein the touchscreen displays at least one object, and wherein after at least one of a plurality of the different signals has been received, when the object is selected by the stylus pen, the controller performs a function corresponding to the received signal on the selected object.

14. A method of controlling a mobile terminal, comprising:
receiving a plurality of different signals from a stylus pen through a short range communication unit, wherein the stylus pen includes a first button and a second button;
recognizing a touch with the stylus pen through a touchscreen;
displaying, on the touchscreen, a first object and a second object; and
performing a prescribed function by combining a type of a signal received from the stylus pen, from among a plurality of the different signals, and a pattern of the recognized touch with the stylus pen,
wherein when the first button and the second button are sequentially manipulated after the first object has been touched with the stylus pen, copying the touched first object to a clipboard, and
wherein when the second object is touched with the stylus pen while the second button keeps being manipulated, copying the touched second object.

\* \* \* \* \*